United States Patent
Nishigori et al.

(10) Patent No.: US 12,443,280 B2
(45) Date of Patent: Oct. 14, 2025

(54) DECODER FOR ENCODED TACTILE SIGNAL INDICATIVE OF A TACTILE STRENGTH DECODING FREQUENCY BANDS IN THE TACTILE SIGNAL

(71) Applicant: SONY GROUP CORPORATION, Tokyo (JP)

(72) Inventors: Shuichiro Nishigori, Tokyo (JP); Hirofumi Takeda, Tokyo (JP); Takahiro Watanabe, Tokyo (JP); Shiro Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/904,894

(22) PCT Filed: Jan. 8, 2021

(86) PCT No.: PCT/JP2021/000499
§ 371 (c)(1),
(2) Date: Aug. 24, 2022

(87) PCT Pub. No.: WO2021/176842
PCT Pub. Date: Sep. 10, 2021

(65) Prior Publication Data
US 2023/0131395 A1    Apr. 27, 2023

(30) Foreign Application Priority Data

Mar. 4, 2020    (JP) .................. 2020-036529

(51) Int. Cl.
*G06F 3/01*    (2006.01)
*A63F 13/285*    (2014.01)

(52) U.S. Cl.
CPC ............ *G06F 3/016* (2013.01); *A63F 13/285* (2014.09)

(58) Field of Classification Search
CPC . G06F 3/01; G06F 3/011; G06F 3/016; G06F 3/017; G06F 3/041; G06F 3/0412;
(Continued)

(56) References Cited

U.S. PATENT DOCUMENTS 11,482,086 B2 *  10/2022  Takeda ................. G06F 3/01
11,496,152 B2 *  11/2022  Suzuki ............... H03M 7/6005
(Continued)

FOREIGN PATENT DOCUMENTS

JP    2016-202486 A    12/2016
WO    2020/003727 A1    1/2020
WO    2020/031483 A1    2/2020

OTHER PUBLICATIONS

International Search Report and Written Opinion of PCT Application No. PCT/JP2021/000499, issued on Mar. 30, 2021, 09 pages of ISRWO.

*Primary Examiner* — Ke Xiao
*Assistant Examiner* — Nelson Lam
(74) *Attorney, Agent, or Firm* — CHIP LAW GROUP

(57) ABSTRACT

A decoder according to the present technology includes a first decoding unit configured to, for encoded data obtained by encoding a tactile signal, decode a first band signal being a signal of a first frequency band in the tactile signal, the encoded data including data obtained by encoding the first band signal and tactile strength information indicative of a tactile strength for a second frequency band different from the first frequency band in the tactile signal, a second decoding unit configured to decode a second band signal being a signal of the second frequency band in the tactile signal on the basis of the tactile strength information in the encoded data, and a synthesis unit configured to synthesize the first band signal decoded by the first decoding unit and the second band signal decoded by the second decoding unit.

16 Claims, 17 Drawing Sheets

(58) Field of Classification Search
CPC ........ G06F 3/0414; G06F 3/042; G06F 3/043; G06F 3/044; G06F 3/045; G06F 3/046; G06F 3/047
USPC .................................................. 345/173–179
See application file for complete search history.

(56) References Cited

U.S. PATENT DOCUMENTS

| | | | | |
|---|---|---|---|---|
| 11,625,122 B2 * | 4/2023 | Kranski | ............. | H03K 17/9647 345/173 |
| 11,823,557 B2 * | 11/2023 | Suzuki | .................... | G06F 3/016 |
| 12,176,927 B2 * | 12/2024 | Nishigori | ................ | H03M 7/70 |
| 12,190,894 B2 * | 1/2025 | Takeda | ................. | G10L 19/002 |
| 12,206,438 B2 * | 1/2025 | Nishigori | ............ | H03M 7/6005 |
| 12,230,124 B2 * | 2/2025 | Suzuki | .................... | G06F 3/016 |
| 2014/0320449 A1 * | 10/2014 | Park | ...................... | G06F 3/0418 345/174 |
| 2015/0109213 A1 * | 4/2015 | Yao | ........................ | G06F 3/0446 345/173 |
| 2015/0109220 A1 * | 4/2015 | Yliaho | .................... | G06F 3/016 345/173 |
| 2015/0301631 A1 * | 10/2015 | Mirfakhraei | ........ | G06F 3/04166 345/173 |
| 2016/0179271 A1 * | 6/2016 | Vandermeijden | ... | G06F 3/04162 345/174 |
| 2016/0202839 A1 * | 7/2016 | Hwang | ................ | G06F 3/04182 345/174 |
| 2016/0342241 A1 * | 11/2016 | Chung | .................. | G06F 3/0446 |
| 2017/0371475 A1 * | 12/2017 | Cheng | ................. | G06F 3/04166 |
| 2018/0322885 A1 * | 11/2018 | Nishigori | ............ | G10L 19/0212 |
| 2021/0266010 A1 * | 8/2021 | Nishigori | ................ | G06F 3/014 |
| 2022/0121340 A1 * | 4/2022 | Oh | ...................... | G06F 3/04144 |
| 2022/0158655 A1 * | 5/2022 | Matsumoto | ........ | H03M 7/3068 |
| 2022/0187915 A1 * | 6/2022 | Takeda | ................ | H03M 7/6052 |

\* cited by examiner

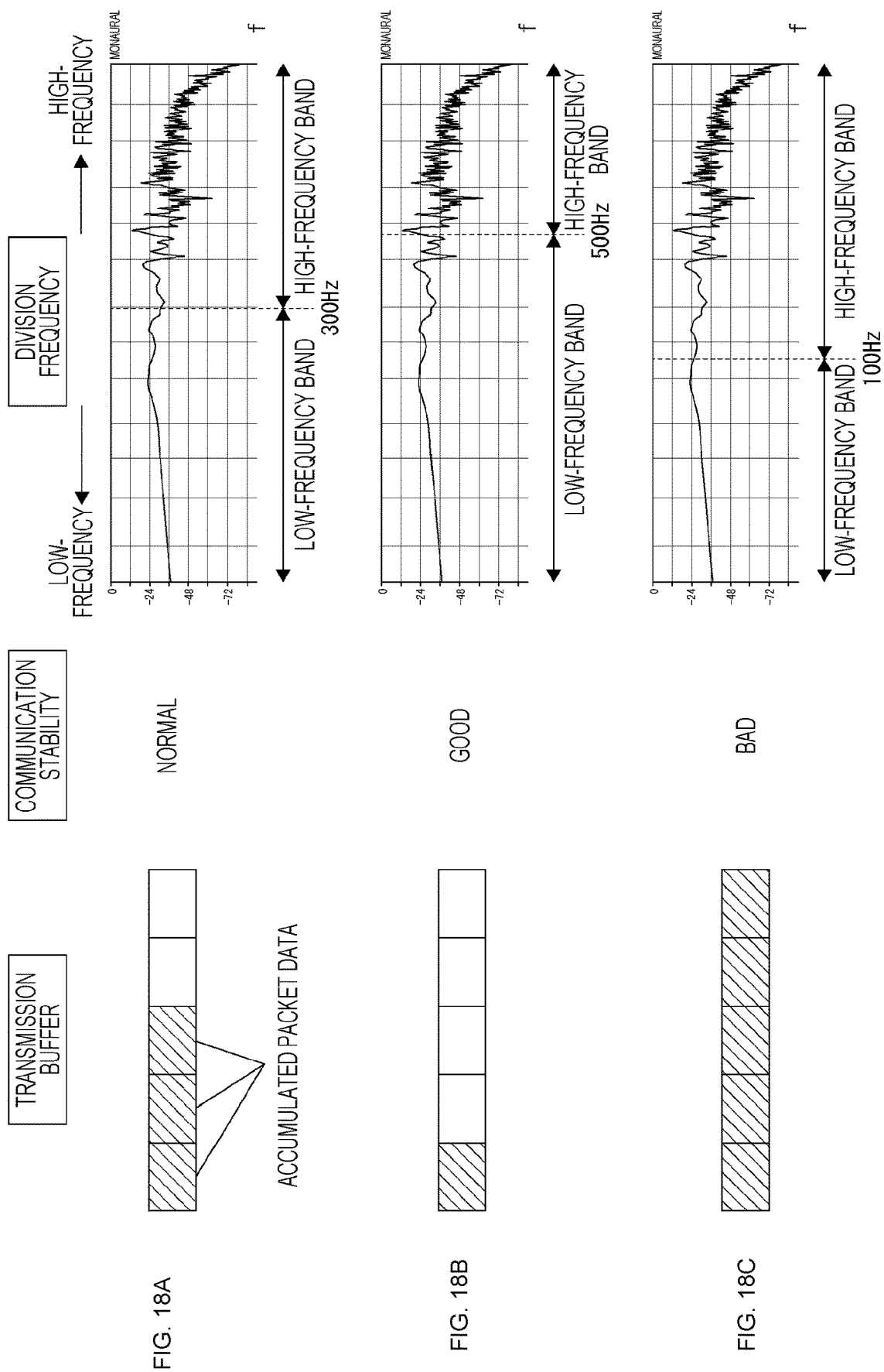

DECODER FOR ENCODED TACTILE SIGNAL INDICATIVE OF A TACTILE STRENGTH DECODING FREQUENCY BANDS IN THE TACTILE SIGNAL

CROSS REFERENCE TO RELATED APPLICATIONS

This application is a U.S. National Phase of International Patent Application No. PCT/JP2021/000499 filed on Jan. 8, 2021, which claims priority benefit of Japanese Patent Application No. JP 2020-036529 filed in the Japan Patent Office on Mar. 4, 2020. Each of the above-referenced applications is hereby incorporated herein by reference in its entirety.

TECHNICAL FIELD

The present technology relates to a decoder for decoding an encoded tactile signal, a method thereof, and a program for the decoder and an encoder for encoding a tactile signal, a method thereof, and a program for the encoder.

BACKGROUND ART

Techniques are now being developed in which a device worn by a user vibrates to apply a tactile stimulus to the user. In such art, the tactile stimulus refers to a physical phenomenon that makes the user feel tactile sensation using vibration phenomena or the like. In addition, generating the tactile stimulus is called tactile presentation.

The technique using such tactile presentation is utilized by various devices in different fields. In one example, terminal equipment provided with a touch panel, such as smartphones, vibrates the touch panel in response to a user's touch operation to apply a tactile stimulus to the user's finger, allowing a touch feeling at contact with buttons or the like displayed on the touch panel to be presented. In addition, for example, a device used for listening to music, such as headphones, can apply a tactile stimulus in time with playing back the music to emphasize the deep bass sounds in the music being played. In addition, for example, a device that provides computer games, virtual reality (VR), or the like, can vibrate a controller or the like to apply a tactile stimulus in response to the operation by the controller or a scene of the content, enhancing the user's immersion experience in the content.

Further, a technique for applying a tactile stimulus to a user on the basis of a tactile signal received from an external device has been developed. In one example, Patent Document 1 mentioned below discloses a technique of applying a tactile stimulus to a user while changing the frequency and amplitude of vibration on the basis of a received signal.

CITATION LIST

Patent Document

Patent Document 1: Japanese Patent Application Laid-Open No. 2016-202486

SUMMARY OF THE INVENTION

Problems to be Solved by the Invention

In this reference, it is conceived that a plurality of tactile presentation devices is provided for a tactile reproduction system that reproduces tactile information and a tactile stimulus is applied to a plurality of sites of the human body.

However, the increased number of sites to which a tactile stimulus is applied will increase the number of channels for tactile signals, leading to an increase in the amount of data. The increased amount of tactile signal data undesirably gives rise to the increased processing load, transmission delay, or the like relating to tactile reproduction.

The present technology is made considering the circumstances mentioned above and is intended to reduce the amount of data of a tactile signal while enhancing tactile reproducibility.

Solutions to Problems

A decoder according to the present technology includes a first decoding unit configured to, for encoded data obtained by encoding a tactile signal, decode a first band signal being a signal of a first frequency band in the tactile signal, the encoded data including data obtained by encoding the first band signal and tactile strength information indicative of a tactile strength for a second frequency band different from the first frequency band in the tactile signal, a second decoding unit configured to decode a second band signal being a signal of the second frequency band in the tactile signal on the basis of the tactile strength information in the encoded data, and a synthesis unit configured to synthesize the first band signal decoded by the first decoding unit and the second band signal decoded by the second decoding unit.

This configuration makes it possible to decode the tactile signal relating to the second frequency band, for the encoded data generated by the encoder according to the present technology while reducing or preventing the deterioration of the tactile reproducibility.

In the decoder according to the present technology described above, it is conceivable that the first frequency band is set to be a band in a lower frequency range than the second frequency band.

For the tactile signal in the band of a predetermined frequency or more, the human body perceives a variation in tactile strengths relatively with ease but perceives a variation in frequencies relatively with difficulty.

In the decoder according to present technology described above, it is conceivable that the tactile strength information is calculated for each frequency in the second frequency band, and the second decoding unit decodes the second band signal on the basis of a total value of the tactile strengths indicated by the tactile strength information calculated for each frequency.

This configuration makes it possible to reproduce, as the tactile strength of the second frequency band, an appropriate tactile strength based on the tactile strength of each frequency in the second band signal before encoding.

In the decoder according to the present technology described above, it is conceivable that the tactile strength information is calculated for one or more major frequencies in the second frequency band, and the second decoding unit decodes the second band signal on the basis of the tactile strength indicated by the tactile strength information calculated for the major frequency.

This configuration makes it possible to reproduce, as the tactile strength of the second frequency band, an appropriate tactile strength based on the tactile strength of the major frequency in the second band signal before encoding.

In the decoder according to the present technology described above, it is conceivable that the second decoding unit converts the tactile strength indicated by the tactile strength information into a signal amplitude and generates a periodic signal having the converted signal amplitude as a decoded signal of the second band signal, the periodic signal having a signal frequency set to a frequency in the second frequency band.

This configuration makes it possible to decode the second band signal to reduce or prevent the deterioration of the tactile reproducibility, for the encoded data generated by the encoder according to the present technology.

In the decoder according to the present technology described above, it is conceivable that the periodic signal has the frequency substantially matching a resonance frequency of a tactile presentation device.

This configuration enables the efficiency of driving the tactile presentation device to be improved. Moreover, the tactile presentation device herein refers to a device that performs tactile presentation on the basis of the tactile signal obtained by the decoder according to the present technology.

In the decoder according to the present technology described above, it is conceivable that the periodic signal has the frequency set on the basis of tactile sensitivity characteristics of a human body.

This configuration makes it possible to set the frequency of the periodic signal to a frequency with high tactile sensitivity of the human body, improving the efficiency of driving the tactile presentation device.

In the decoder according to the present technology described above, it is conceivable that the periodic signal has the frequency set on the basis of auditory sensitivity characteristics of a human body.

This configuration makes it possible to set the frequency of the periodic signal to a frequency with low auditory sensitivity of the human body, reducing the noise occurring by driving the tactile presentation device.

In the decoder according to the present technology described above, it is conceivable that the second decoding unit sets the frequency of the periodic signal on the basis of an operation.

This configuration makes it possible for the user to select the frequency of the periodic signal optionally.

Further, a decoding method according to the present technology includes a first decoding step of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal, a second decoding step of decoding a second band signal being a signal of the second frequency band in the tactile signal on the basis of the tactile strength information in the encoded data, and a synthesis step of synthesizing the first band signal decoded in the first decoding step and the second band signal decoded in the second decoding step.

Even such a decoding method can achieve operations similar to those obtained by the decoder according to the present technology described above.

Furthermore, the first program according to the present technology is a program causing an information processing apparatus to implement as: a first decoding function of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal; a second decoding function of decoding a second band signal being a signal of the second frequency band in the tactile signal on the basis of the tactile strength information in the encoded data; and a synthesis function of synthesizing the first band signal decoded by the first decoding function and the second band signal decoded by the second decoding function.

Such a first program according to the present technology allows implementation of the decoder according to the present technology described above.

An encoder according to the present technology includes a band division unit configured to divide a tactile signal into a first band signal being a signal of a first frequency band and a second band signal being a signal of a second frequency band different from the first frequency band, a first encoding unit configured to encode the first band signal, a tactile strength calculation unit configured to calculate tactile strength information indicative of a tactile strength for the second frequency band on the basis of the second band signal, and an encoded data generation unit configured to generate encoded data including the tactile strength information and data obtained by encoding the first band signal.

This configuration makes it possible to use the sensitivity characteristics of the human body to improve the compression efficiency of the tactile signal information. The sensitivity characteristics have an easy perception of both the tactile strength variation and frequency variation in the predetermined frequency band, but in another frequency band, the tactile strength variation is easy to perceive, and the frequency variation is difficult to perceive.

In the encoder according to the present technology described above, it is conceivable that the first frequency band is set to be a band in a lower frequency range than the second frequency band.

For the tactile signal in the band of a predetermined frequency or more, the human body perceives a variation in tactile strengths relatively with ease but perceives a variation in frequencies relatively with difficulty.

In the encoder according to the present technology described above, it is conceivable that the first frequency band and the second frequency band have a division frequency made to be variable between the first and second frequency bands.

Making the division frequency variable makes it possible to adjust the balance between the effect of reducing the data due to encoding and the effect of reducing or preventing a decrease in tactile reproducibility.

In the encoder according to the present technology described above, it is conceivable that the band division unit changes the division frequency depending on stability of communication with an external device.

This configuration makes it possible to change the division frequency to enhance the data reduction effect, that is, to lower the bit rate of the communication data, upon unstable communication with the external device to which the encoded data is transmitted. In contrast, upon stable communication, it is possible to change the division frequency to improve the tactile reproducibility.

In the encoder according to the present technology described above, it is conceivable that the band division unit lowers the division frequency in a case where the communication stability is lower than in a case where the communication stability is high.

This configuration makes it possible to change the division frequency to enhance the data reduction effect, that is, to lower the bit rate of the communication data upon unstable communication. In contrast, upon stable communication, it is possible to change the division frequency to improve the tactile reproducibility.

In the encoder according to the present technology described above, it is conceivable that the tactile strength calculation unit calculates the tactile strength information for each frequency in the second frequency band.

This configuration makes it possible to reproduce, as the tactile strength of the second frequency band, an appropriate tactile strength based on the tactile strength of each frequency in the second band signal before encoding.

In the encoder according to the present technology described above, it is conceivable that the tactile strength calculation unit calculates the tactile strength information only for one or more major frequencies in the second frequency band.

This configuration makes it possible to reproduce, as the tactile strength of the second frequency band, an appropriate tactile strength based on the tactile strength of the major frequency in the second band signal before encoding.

Further, an encoding method according to the present technology includes a band division step of dividing a tactile signal into a first band signal being a signal of a first frequency band and a second band signal being a signal of a second frequency band different from the first frequency band, a first encoding step of encoding the first band signal, a tactile strength calculation step of calculating tactile strength information indicative of a tactile strength for the second frequency band on the basis of the second band signal, and an encoded data generation step of generating encoded data including the tactile strength information and data obtained by encoding the first band signal.

Even such an encoding method can achieve operations similar to those obtained by the encoder according to the present technology described above.

Furthermore, the second program according to the present technology is a program causing an information processing apparatus to implement as: a band division function of dividing a tactile signal into a first band signal being a signal of a first frequency band and a second band signal being a signal of a second frequency band different from the first frequency band; a first encoding function of encoding the first band signal; a tactile strength calculation function of calculating tactile strength information indicative of a tactile strength for the second frequency band on the basis of the second band signal; and an encoded data generation function of generating encoded data including the tactile strength information and data obtained by encoding the first band signal.

Such a second program according to the present technology allows implementation of the encoder according to the present technology described above.

BRIEF DESCRIPTION OF DRAWINGS

FIGS. 18A, 18B, and 18C are diagrams illustrated to describe a control example of a division frequency depending on communication stability.

MODE FOR CARRYING OUT THE INVENTION

Embodiments according to the present technology are now described in the following order with reference to the attached drawings.

<1. Overview of Tactile Reproduction System>
<2. Configuration of Encoder>
<3. Configuration of Playback Device>
<4. Configuration of Decoder>
<5. Example of Use of Tactile Reproduction System>
<6. Tactile Reproduction Technique according to Embodiment>
[6-1. Challenges relating to Tactile Signal Transmission]
[6-2. Encoding Technique]
[6-3. Decoding Technique]
[6-4. Control of Division Frequency depending on Communication Stability]
<7. Summary of Embodiments>
<8. Present Technology>

The terms used herein are now defined as follows:

Tactile stimulus: physical phenomena that cause a person to perceive tactile sensation, such as vibration phenomena.

Tactile presentation: producing a tactile stimulus.

Tactile information: information perceived by tactile sensation, such as vibration information.

Tactile signal: a signal representing a pattern of tactile stimuli, such as signals expressing vibration waveforms.

Tactile recipient: a person subjected to tactile presentation.

Tactile sensitivity: sensitivity indicative of the degree of subjective perception of strength for tactile stimulus. It depends on receptors and sites on the human body.

Tactile sensitivity characteristics: characteristics relating to tactile sensitivity of humans. They depend on body sites (hands, face, feet, etc.)

Encoded data: Data created by encoding signals. It has streams and frames as more specific concepts.

Encoded tactile data: Data created by encoding tactile signals.

<1. Overview of Tactile Reproduction System>

Figure 1:
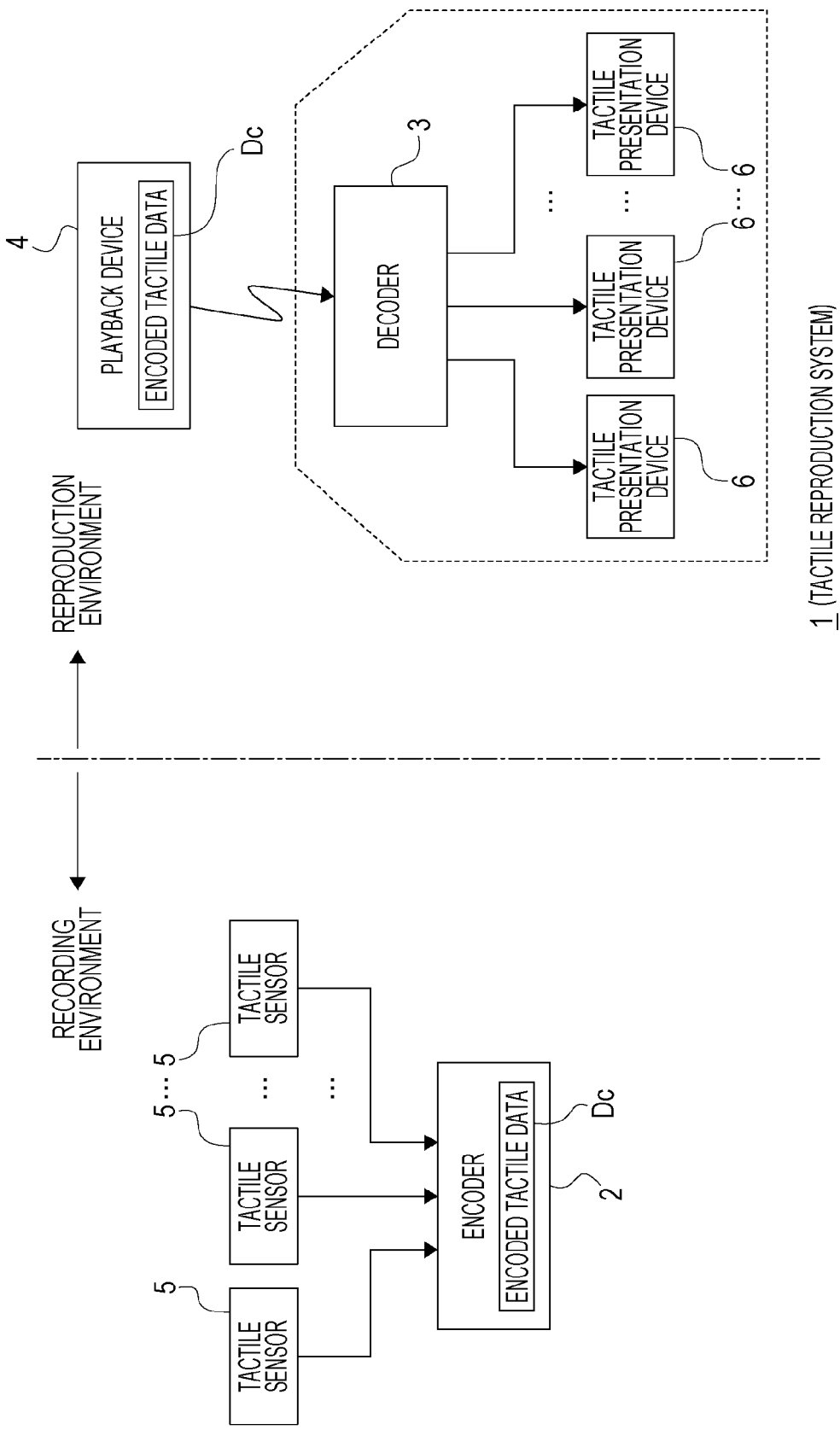
FIG. 1 illustrates an exemplary configuration of a tactile reproduction system that includes an encoder and a decoder according to an embodiment according to the present technology.

FIG. 1 illustrates an exemplary configuration of a tactile reproduction system 1 that includes an encoder (encoder 2) and a decoder (decoder 3) according to an embodiment according to the present technology.

An environment for implementing tactile reproduction according to the present embodiment can categorize into a recording environment and a reproduction environment. The recording environment encodes a tactile signal obtained by sensing tactile information being a target (tactile stimulus) and records encoded tactile data Dc obtained by the encoding. The reproduction environment reproduces the tactile information on the basis of a tactile signal obtained by decoding the encoded tactile data Dc.

As illustrated, the tactile reproduction system 1 includes a plurality of tactile sensors 5 and an encoder 2 in the recording environment and also includes a playback device 4, a decoder 3, and a plurality of tactile presentation devices 6 in the reproduction environment. The encoder 2 connects with the tactile sensors 5. The playback device 4 can acquire the encoded tactile data Dc. The decoder 3 is communicable wirelessly with the playback device 4. The plurality of tactile presentation devices 6 connects with the decoder 3.

The tactile sensor 5 senses tactile stimuli, and in this example, a vibration sensor is used, such as a piezo pickup or an acceleration sensor. The tactile sensor comes in contact with a target object to be sensed, i.e., in this example, the human body, to output vibration or motion in the form of a voltage variation.

In this example, the respective tactile sensors 5 are connected to the encoder 2 by wire and are attached to different sites of the human body being a target object, sensing a tactile stimulus occurring in each site.

The encoder 2 includes, for example, a computer processor such as a central processing unit (CPU) or digital signal processor (DSP). The encoder 2 subjects a detection signal (tactile signal) obtained by each tactile sensor 5 to the encoding in accordance with a predetermined data format and stores the resulting encoded tactile data Dc in, for example, an internal storage device.

The playback device 4 includes a computer processor such as a CPU or DSP and transmits the acquired encoded tactile data Dc to the decoder 3. In one example, the encoded tactile data Dc recorded in the recording environment is acquired by the playback device 4 over a required network such as the Internet, a home network, a local area network (LAN), and a satellite communication network. The encoded tactile data Dc also can be acquired by the playback device 4 in the form of being recorded on a portable recording medium.

The decoder 3 decodes the encoded tactile data Dc received from the playback device 4 and drives each of the tactile presentation devices 6 on the basis of the tactile signal obtained by the decoding.

The tactile presentation device 6 generates a tactile stimulus and, in this example, employs a vibration device such as a vibrator or an actuator.

In this example, the respective tactile presentation devices 6 are attached to different sites of the human body of a tactile recipient and reproduce the tactile stimulus sensed by the respective corresponding tactile sensors 5.

In this connection, in this example, each tactile presentation device 6 is wire-connected to the decoder 3. A portion surrounded by the broken line in the figure, that is, the portion including the decoder 3 and the tactile presentation devices 6 is attached to the tactile recipient.

The tactile reproduction system 1 can be a configuration in which the playback device 4 has the function of the decoder 3, and the playback device 4 is connected to the respective tactile presentation devices 6 by wire. However, in that case, there is a possibility to cause annoyance to the tactile recipient wearing the tactile presentation device 6. Such annoyance is liable to increase as the number of sites subjected to tactile stimuli increases.

The configuration of the tactile reproduction system 1 illustrated in FIG. 1 makes it possible to prevent such annoyance to the tactile recipient.

The tactile reproduction system 1 illustrated in FIG. 1 reproduces, to the tactile receptor, the tactile sensation of each body site perceived by a person wearing the tactile sensor 5, so being available even in the case where both persons are apart from each other.

Moreover, the number of the tactile sensors 5 and the tactile presentation devices 6, that is, the number of sites of the human body that sense and reproduce the tactile stimulus, is at least three or more in the present embodiment.

<2. Configuration of Encoder>

Figure 2:
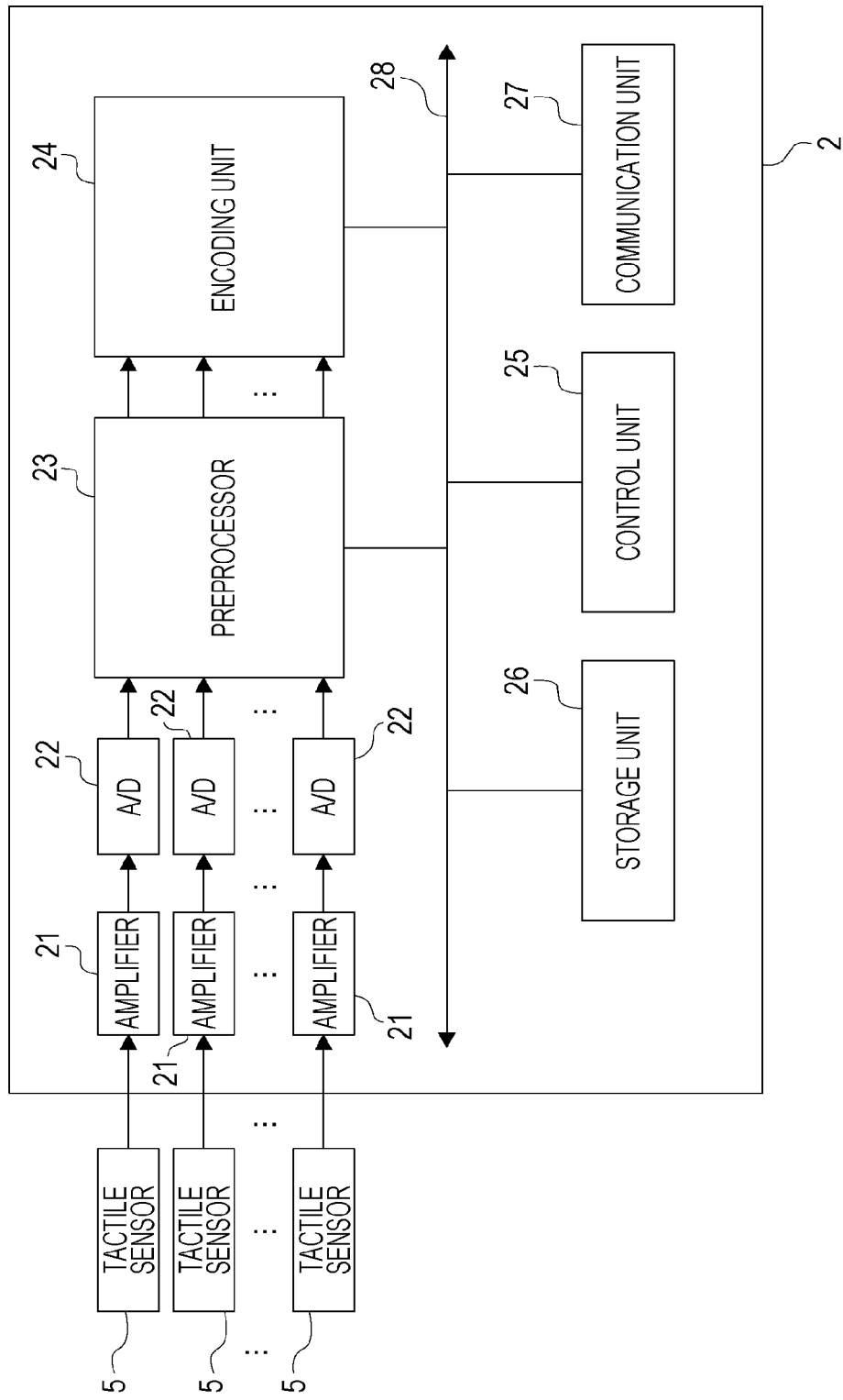
FIG. 2 is a diagram illustrated to describe an exemplary internal configuration of the encoder as an embodiment.

FIG. 2 is a diagram illustrated to describe an exemplary internal configuration of the encoder 2. Moreover, FIG. 2 also illustrates the tactile sensors 5 of FIG. 1 in addition to the exemplary internal configuration of the encoder 2.

As illustrated, the encoder 2 includes a plurality of amplifiers 21, a plurality of analog-to-digital (A/D) converters 22, a preprocessor 23, an encoding unit 24, a control unit 25, a storage unit 26, a communication unit 27, and a bus 28. The preprocessor 23, the encoding unit 24, the control unit 25, the storage unit 26, and the communication unit 27 are connected via the bus 28, making data communicable to each other.

Signals detected by the tactile sensors 5 are input to the respective corresponding amplifiers 21, in which the detection signals are adjusted to have an appropriate dynamic range. Then, the resulting signals are input to the respective corresponding A/D converters 22, in which the signals are subject to analog-to-digital (A/D) conversion.

The detected signals subjected to the A/D conversion (i.e., the tactile signals obtained from each body site) are input to the preprocessor 23. The preprocessor 23 performs various digital signal processing such as noise reduction or calibration of sensor characteristics of the tactile sensor 5.

Each tactile signal obtained by being subjected to signal processing in the preprocessor 23 is input to the encoding unit 24.

The encoding unit 24 includes, for example, a Digital Signal Processor (DSP). The encoding unit 24 encodes the input tactile signal in accordance with a predetermined data format to obtain the encoded tactile data Dc mentioned above.

Moreover, the encoding of the tactile signal according to the present embodiment is described later.

The control unit 25 includes, for example, a microcomputer having a CPU, read-only memory (ROM), random-access memory (RAM), and the like. The control unit 25 executes processing in accordance with a program stored in the ROM to control the entire encoder 2.

In one example, the control unit 25 communicates data with an external device via the communication unit 27.

The communication unit 27 is capable of communicating data with an external device over a network such as the Internet. The control unit 25 is capable of communicating data with an external device connected to a network via the communication unit 27. In particular, the encoded tactile data Dc obtained by the encoding unit 24 is transmittable to an external device via the communication unit 27.

The storage unit 26 refers inclusively to a storage device such as a hard disk drive (HDD) or solid-state drive (SSD) and is arranged in the encoder 2 for storing various data. In one example, the storage unit 26 stores data necessary to the control by the control unit 25. In addition, the encoded tactile data Dc obtained by the encoding unit 24 can be stored in the storage unit 26 under the control of the control unit 25.

<3. Configuration of Playback Device>

Figure 3:
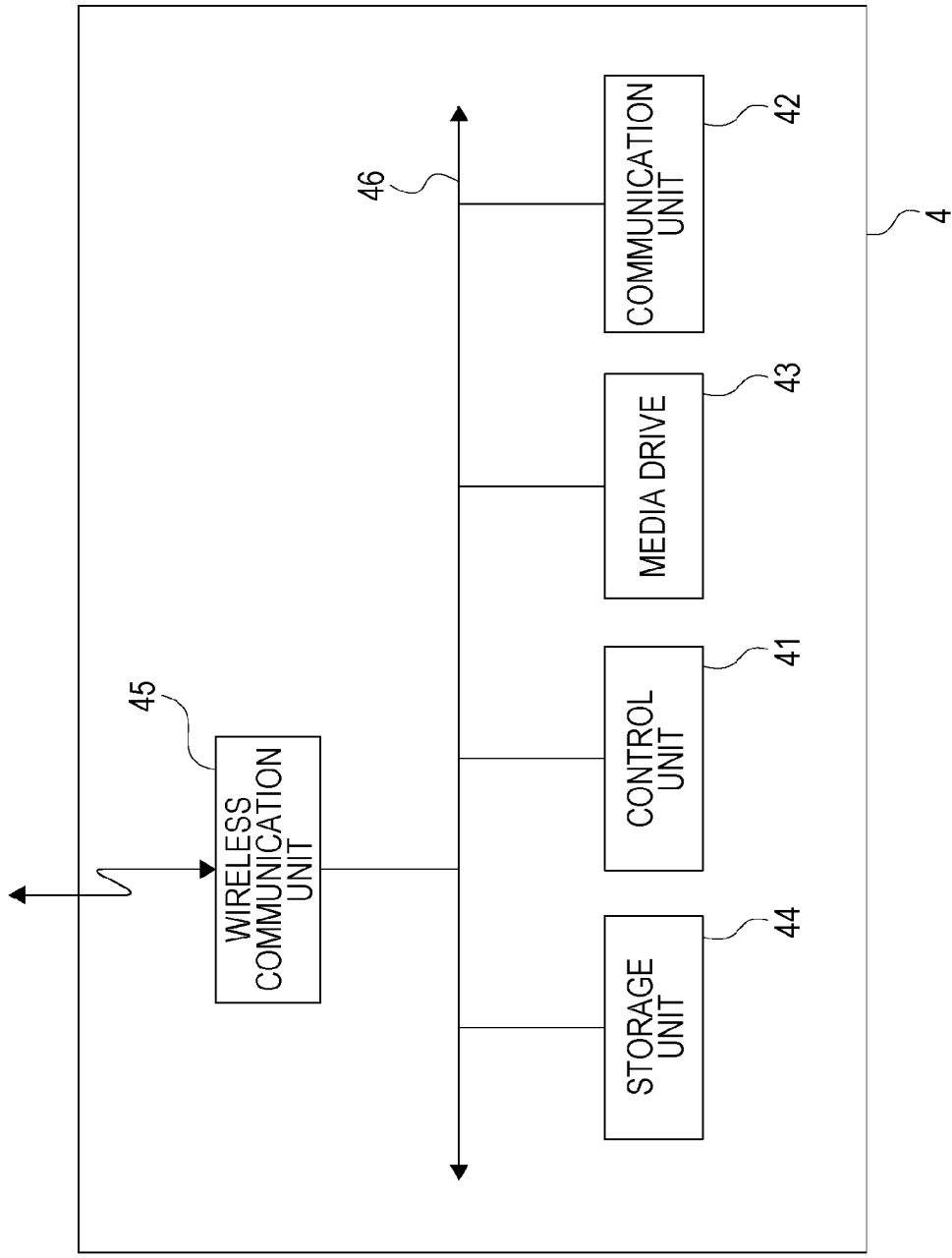
FIG. 3 is a diagram illustrating an exemplary internal configuration of the playback device as a first embodiment.

FIG. 3 is a diagram illustrating an exemplary internal configuration of the playback device 4.

As illustrated, the playback device 4 includes a control unit 41, a communication unit 42, a media drive 43, a storage unit 44, and a wireless communication unit 45, and also includes a bus 46 that connects these components to be communicable to each other.

The control unit 41 includes, for example, a microcomputer having a CPU, ROM, RAM, or the like, and controls the entire playback device 4.

The communication unit 42 is capable of communicating data with an external device over a network such as the Internet. The control unit 41 is capable of communicating data with an external device connected to a network via the communication unit 42. In particular, the encoded tactile data Dc can be received by the communication unit 42 from an external device such as a server device on a network.

The media drive 43 is a reader/writer unit to which a portable recording medium is detachable and capable of writing or reading data to or from the attached recording medium. Examples of the recording medium supported by the media drive 43 can include a memory card (e.g., a portable flash memory), an optical disk recording medium, and the like.

The media drive 43 makes it possible to read out the encoded tactile data Dc recorded on the portable recording medium.

The storage unit 44 refers inclusively to a storage device such as an HDD or SSD and is arranged in the playback device 4 for storing various data. In one example, the storage unit 44 stores data necessary for the control unit 41 to perform the control. In addition, the encoded tactile data Dc read by the media drive 43 or the encoded tactile data Dc received by the communication unit 42 from an external device can be stored in the storage unit 44 under the control of the control unit 41.

The wireless communication unit 45 performs short-range wireless communication using a predetermined communication scheme such as Bluetooth (registered trademark).

In this regard, the control unit 41, as a part of the entire control described above, controls the communication unit 42 in such a way that the communication unit 42 receives the encoded tactile data Dc or controls the media drive 43 in such a way that the media drive 43 reads the encoded tactile data Dc. In addition, the control unit 41 controls the wireless communication unit 45 in such a way that the wireless communication unit 45 transmits the encoded tactile data Dc obtained by the communication unit 42 or the media drive 43 to the decoder 3.

<4. Configuration of Decoder>

Figure 4:
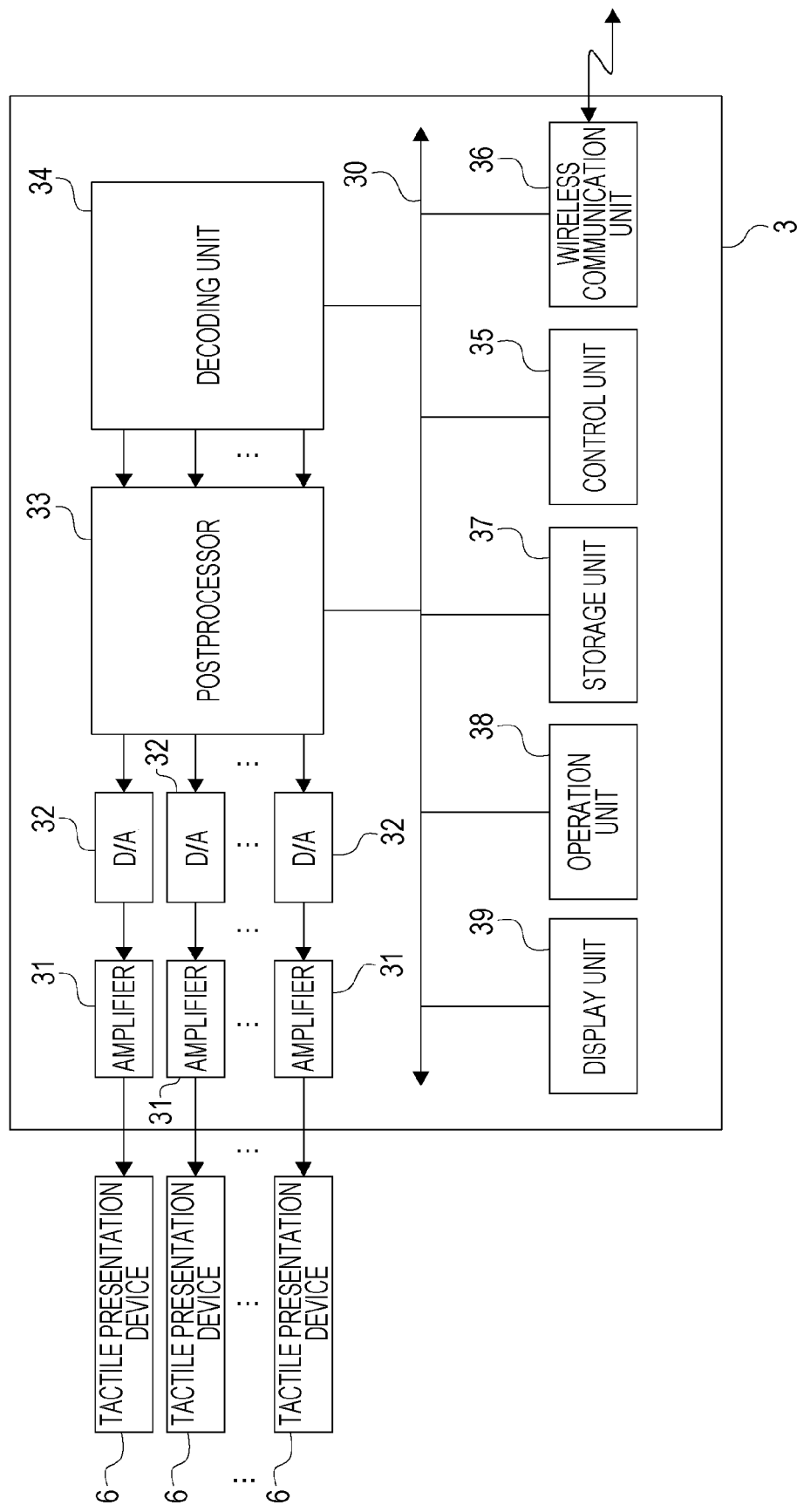
FIG. 4 is a diagram illustrated to describe an exemplary internal configuration of the decoder as an embodiment.

FIG. 4 is a diagram illustrated to describe an exemplary internal configuration of the decoder 3 and also illustrates each tactile presentation device 6 in addition to the exemplary internal configuration of the decoder 3.

As illustrated, the decoder 3 includes a plurality of amplifiers 31, a plurality of digital-to-analog (D/A) converters 32, a postprocessor 33, and a decoding unit 34. The decoder 3 also includes a control unit 35, a wireless communication unit 36, a storage unit 37, an operation unit 38, a display unit 39, and a bus 30. The postprocessor 33, the decoding unit 34, the control unit 35, the wireless communication unit 36, and the storage unit 37 are connected via the bus 30, allowing data to be communicable to each other.

The control unit 35 includes, for example, a microcomputer having a CPU, ROM, RAM, or the like, and controls the entire decoder 3.

The wireless communication unit 36 performs short-range wireless communication with the wireless communication unit 45 of the playback device 4 using a communicable scheme such as Bluetooth. The wireless communication unit 36 receives the encoded tactile data Dc transmitted from the playback device 4.

The storage unit 37 is, for example, a storage device similar to the storage unit 26, the storage unit 44, or the like, and stores various data to be used by the control unit 35 or the like.

The operation unit 38 refers inclusively to various operators or handlers such as buttons, keys, and a touch panel (touch sensor) provided in the decoder 3 and outputs operation input information corresponding to the operation input to the control unit 35.

The display unit 39 includes a display device, such as a liquid crystal display (LCD) or organic electro-luminescence (EL) display, and displays various types of information such as image information on the basis of an instruction from the control unit 35.

The decoding unit 34 decodes the encoded tactile data Dc that is input through the wireless communication unit 36 using a technique described later to obtain a tactile signal for each body site. The tactile signal for each site acquired by the decoding unit 34 is input to the postprocessor 33.

The postprocessor 33 performs signal processing, such as calibration on the tactile presentation device 6 or predetermined filtering, as necessary, for the input tactile signal for each body site.

The tactile signals processed by the postprocessor 33 are input to the respective corresponding D/A converters 32, in which the signals are subjected to digital-to-analog (D/A) conversion. Then, the signals are adjusted to have an appropriate dynamic range in the respective corresponding amplifiers 31 and are output to the corresponding tactile presentation devices 6.

This configuration makes it possible to drive the respective tactile presentation devices 6 on the basis of the tactile signal, applying the tactile stimulus that is to be sensed to the tactile recipient in the detection environment (i.e., reproducible tactile information).

Moreover, although only the tactile signal is the subject of the above description, it is also possible to record audio signals or video signals together with the tactile signal to provide sound or an image together with the tactile information to the tactile recipient.

<5. Example of Use of Tactile Reproduction System>

Reproducing content that also performs tactile presentation in addition to video is conceivable.

Figure 5:
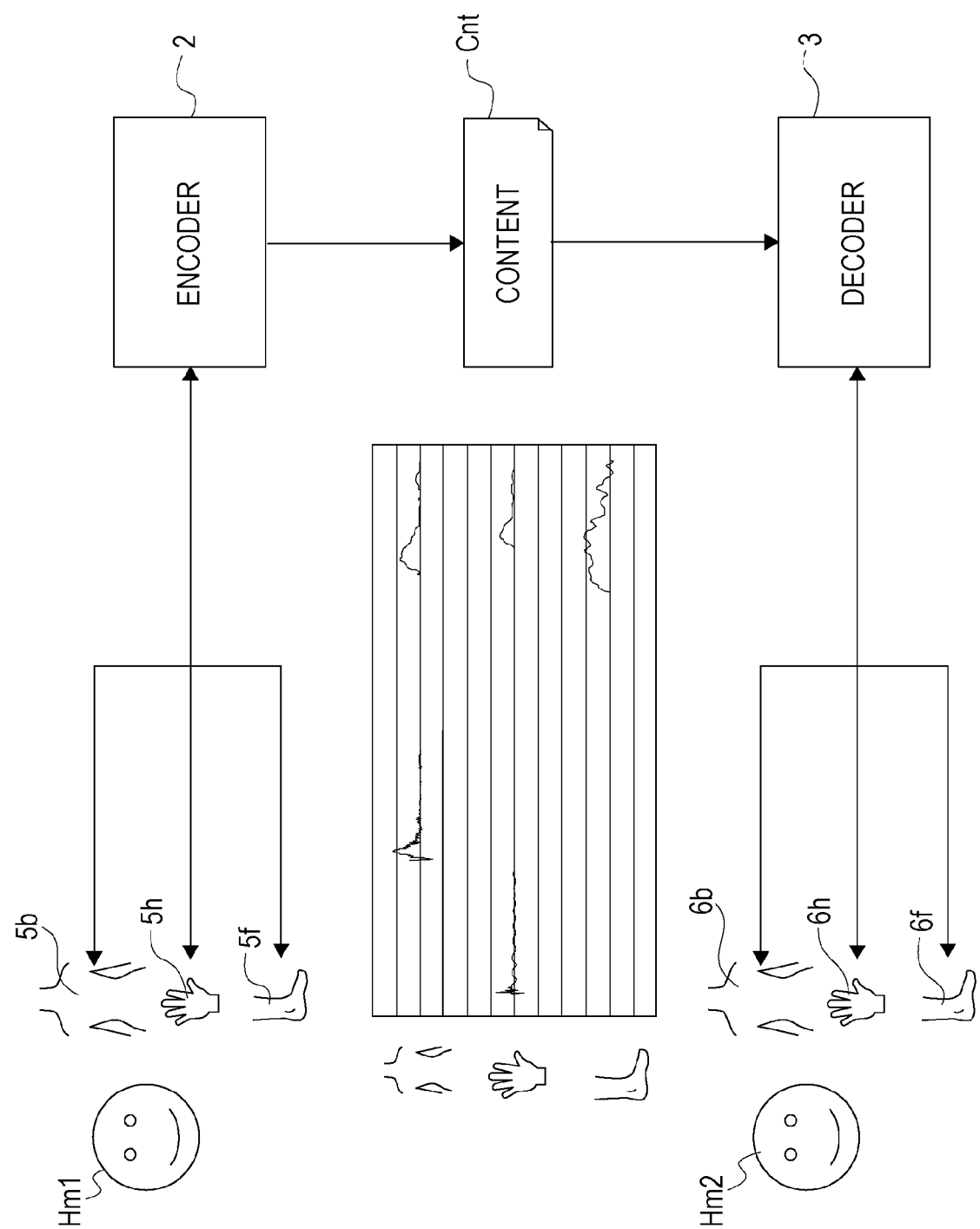
FIG. 5 is a diagram illustrated to describe a usage example of the tactile reproduction system.

FIG. 5 is a diagram illustrated to describe a usage example of the tactile reproduction system 1.

In FIG. 5, encoded data is recorded as content Cnt by recording in synchronization with a video. This encoded data is obtained by the encoder 2 for encoding a tactile signal recorded in the tactile sensors 5 (in the figure, a tactile sensor 5b for torso, a tactile sensor 5h for fingers, and a tactile sensor 5f for feet) attached to a person Hm1 who records a tactile sensation in addition to the video upon creating the content. Upon the playback, the recorded content Cnt is transmitted to the decoder 3 using, for example, wireless communication, and the decoding unit 34 of the decoder 3 decodes the received content Cnt. This configuration allows the tactile presentation to be performed on the basis of the corresponding tactile signals through the tactile presentation devices 6 (in the figure, a tactile presentation device 6b for torso, a tactile presentation device 6h for fingers, and a tactile presentation device 6f for feet) worn by a person Hm2 who is the tactile recipient.

Examples of the scenes in which the tactile sensation is actually presented in the video include a scene in which a character beats (is beaten), shoots with a gun (is shot), is hit by a storm, or feels the ground shaking.

In the figure, waveforms of the tactile signal for the torso, hands, and feet are illustrated as an actual example of the tactile signal in the content. Describing this example in time series, first, in the scene where the person Hm1 shoots an opponent with a gun, the vibration caused by the recoil caused by the bullet firing occurs on the fingers. Then, in the scene where the opponent also shoots the person Hm1 in the torso (his body) with a gun, the vibration caused by the impact of the torso that has been shot is generated in the torso. After that, in the scene where an earthquake occurs, the vibration of the ground is gradually propagated to the feet, torso, and fingers.

In one example, playing back such content reproduces the tactile sensation by vibration in addition to video and audio, enabling the person Hm2 as a tactile recipient to experience high-quality reality.

<6. Tactile Reproduction Technique According to Embodiment>

[6-1. Challenges relating to Tactile Signal Transmission]

The description is now given of a tactile reproduction technique according to an embodiment.

The first thing to describe is the tactile reproduction technique according to an embodiment that focuses on the tactile characteristics of humans.

Figure 6:
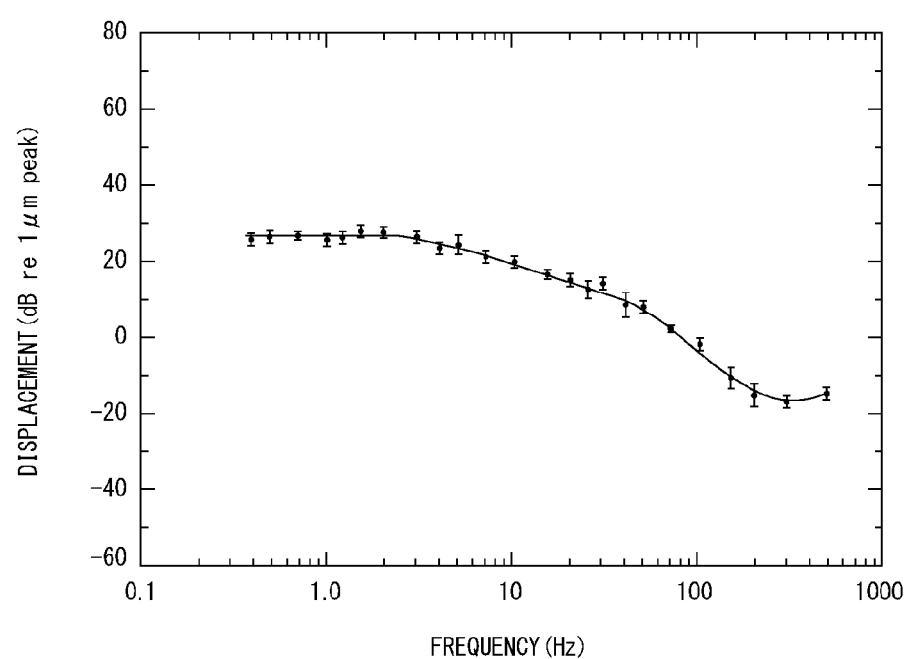
FIG. 6 is a diagram illustrated to describe a vibration detection threshold curve.

The vibration detection threshold curve illustrated in FIG. 6 is known as a reference for the tactile sensitivity of humans. Moreover, in FIG. 6, the horizontal axis represents the frequency, and the vertical axis represents the magnitude of the tactile stimulus (vibration is represented as displacement in this example). The vibration detection threshold curve in FIG. 6 is based on the experimental results described in the article entitled "Four channels mediate the mechanical aspects of touch" by S. J., Bolanowski, 1988.

The vibration detection threshold curve illustrated in FIG. 6 is an example of experimentally examining whether or not a person feels the vibration as a tactile sensation, that is, the tactile sensitivity. Humans fail to perceive a vibration smaller than that shown in this curve as the tactile sensation.

FIG. 6 shows that the frequency with the highest tactile sensitivity of humans is commonly approximately 200 hertz (Hz). Thus, devices or applications that generate vibration are often designed to generate vibration up to approximately 200 Hz.

On the other hand, although not shown in the results of FIG. 6, it is commonly known that humans can perceive a vibration with a frequency of up to approximately 1 kilohertz (kHz) as a tactile sensation. Humans can perceive a vibration with a frequency component of approximately 1 kHz and a vibration with no frequency component of approximately 1 kHz as different tactile sensations.

In one example, the vibration generated in unplugging a cork stopper of a bottle includes a vibration with a frequency up to several kHz. In the case where such vibration is transferred to a user as the vibration with a frequency of up to several hundred Hz from the device that presents the tactile sensation, the user fails to feel the vibration as a tactile sensation with a satisfactory sense of reality upon unplugging the cork of the bottle.

Thus, it is necessary to present the tactile sensation using the vibration with a frequency of up to approximately 1 kHz to offer a more realistic tactile experience to the user.

However, widening the bandwidth of the frequency included in the signal increases the amount of data in the signal, so a delay in the transmission or reception of the signal is more likely to occur. In other words, the improved quality of the tactile sensation can cause a situation in which the tactile sensation fails to be presented at the appropriate timing.

Delays in signal transmission or reception and in the tactile presentation are described with a specific example.

The description is first given of the amount of tactile signal data. In the case of transmitting a tactile signal between devices, first, the tactile signal is converted to digital data. The capacity of digital data is represented in terms of the bit depth conveyed or processed per unit of time, that is, a bit rate B. In this connection, the tactile sensitivity depends not only on the frequency of vibration but also on the amplitude. In one example, the experimental results of FIG. 6 mentioned above show that the amplitude of vibration perceived by humans is approximately 50 decibel (dB) (range of −20 dB to 30 dB) or more, and the frequency is approximately 1000 Hz. Moreover, accounting for the distribution of tactile information actually felt by humans, it is considered that the amplitude of vibration is approximately 70 dB.

In the case of converting the tactile signal TS into digital data using linear pulse-code modulation (LPCM), the amplitude of vibration expressible by 1 bit is 6 dB. In other words, the amplitude of vibration of 70 dB necessitates 12 bits. On the other hand, in the case of the vibration frequency of 1000 Hz, the sampling frequency is to be doubled to 2000 Hz, and the bit rate BC is given by Formula (1) as follows:

$$B0 = 12 \text{ bit/sample} \times 2000 \text{ sample/sec} = 24 \text{ kbit/sec} \qquad \text{Formula (1)}$$

This value itself is relatively very smaller than, for example, the bit rate=700 kbps per channel (kbps/ch) of a compact disc (CD), which is a representative format for audio signals, so this tactile signal being additionally incorporated into any system seems unlike to cause a significant problem.

However, as mentioned above, it is known that the bandwidth of the tactile signal perceptible by humans extends up to several kHz. In one example, in the case of reproducing a tactile signal up to 2000 Hz, the bit rate becomes 48 kbit/sec, which is twice that of Formula (1).

Further, the tactile sensation is distributed over the entire surface of the human body, unlike the visual sense (two eyes) and the auditory sense (two ears). In considering only the fingertips of both hands, there are ten sites to be sensed, and if tactile signals from all the fingertips are to be processed, the bit rate will be further increased by ten times to 480 kbit/sec. The increased number of body sites to be sensed in joints of the palm and fingers will increase the bit rate significantly.

Furthermore, the tactile signal is basically a one-dimensional signal. However, the physical phenomenon of vibration can be captured on three axes (x, y, z). To process all of them, a bit rate of 1440 kbit/sec, three times as much, is necessary, and this value is as large as exceeding the bit rate of 1411 kbit/sec of audio CDs.

In this way, the total amount of tactile signal data to be used increases as the reproducibility of the tactile stimulus improves and the number of sites of the user that apply the tactile stimulus increases. Then, the increase in the total amount of data causes a heavy load on the network system that transmits the tactile signal.

Further, other factors than the total amount of data as described above are conceivable as a factor for the delay.

In one example, in the case of transmitting the tactile signal using wireless communication, the encoded data of the tactile signal is likely to be lost due to interference or the like on the transmission line. If data loss occurs, data is retransmitted from a device on the transmitting side, and a delay is likely to occur in the time taken for the receiving side to complete the reception of the data. In other words, the increased capacity of the data to be retransmitted increases the time taken for retransmitting the data in response to the data loss, resulting in further delaying the time until the transmission or reception of the tactile signal is completed normally.

In this way, if the delay occurs in the time until transmission of the tactile signal is completed, the tactile sensation reproducibility decreases in some cases. Specifically, a situation can occur in which the tactile stimulus is out of synchronization with the content related to other sensations, such as images and sounds, because the tactile stimulus is unoffered to the user at appropriate timings.

The description is now given of the application to a specific wireless communication mode considering the situation mentioned above.

A device that performs tactile presentation is installed, being in contact with the user, and is commonly desired to communicate wirelessly with other devices from the viewpoint of the weight of the device. However, in the case of using wideband wireless communications such as Wi-Fi (registered trademark), the battery of the device will grow bigger from the viewpoint of power consumption, so the user's convenience is likely to decrease. In addition, in the case of using Wi-Fi (registered trademark), it commonly takes a processing time from the signal transmission request by a device on the transmitting side to the processing of the received signal in a device on the receiving side, so delays larger than other wireless communications are liable to occur.

On the other hand, short-range wireless communication such as Bluetooth (registered trademark) can perform communication with low power consumption and low delay, compared with other wireless communications, so it is considered suitable for transmission of the tactile signal. However, short-range wireless communications have a smaller allowable amount of data transmittable at one time than that of other wireless communications. In one example, in the transmission of content that applies a tactile stimulus to a user while synchronizing with video or sound, a situation where the communication capacity allocated to the transmission of the tactile signal is insufficient is conceivable.

Further, in the case where tactile sensation is intended to be transmitted to the user in addition to the service for streaming video or audio via the Internet, the communication capacity to be allocated for the transmission of tactile signals is liable to be insufficient, for example, due to the quality of service (QoS) function corresponding to the line condition of the network.

In view of the circumstances mentioned above, the present embodiment is intended to achieve a decrease in delays of the tactile signal and prevention of deterioration of the tactile reproducibility by reducing the amount of transmitted data without impairing the tactile reproducibility as much as possible.

[6-2. Encoding Technique]

Figure 7:
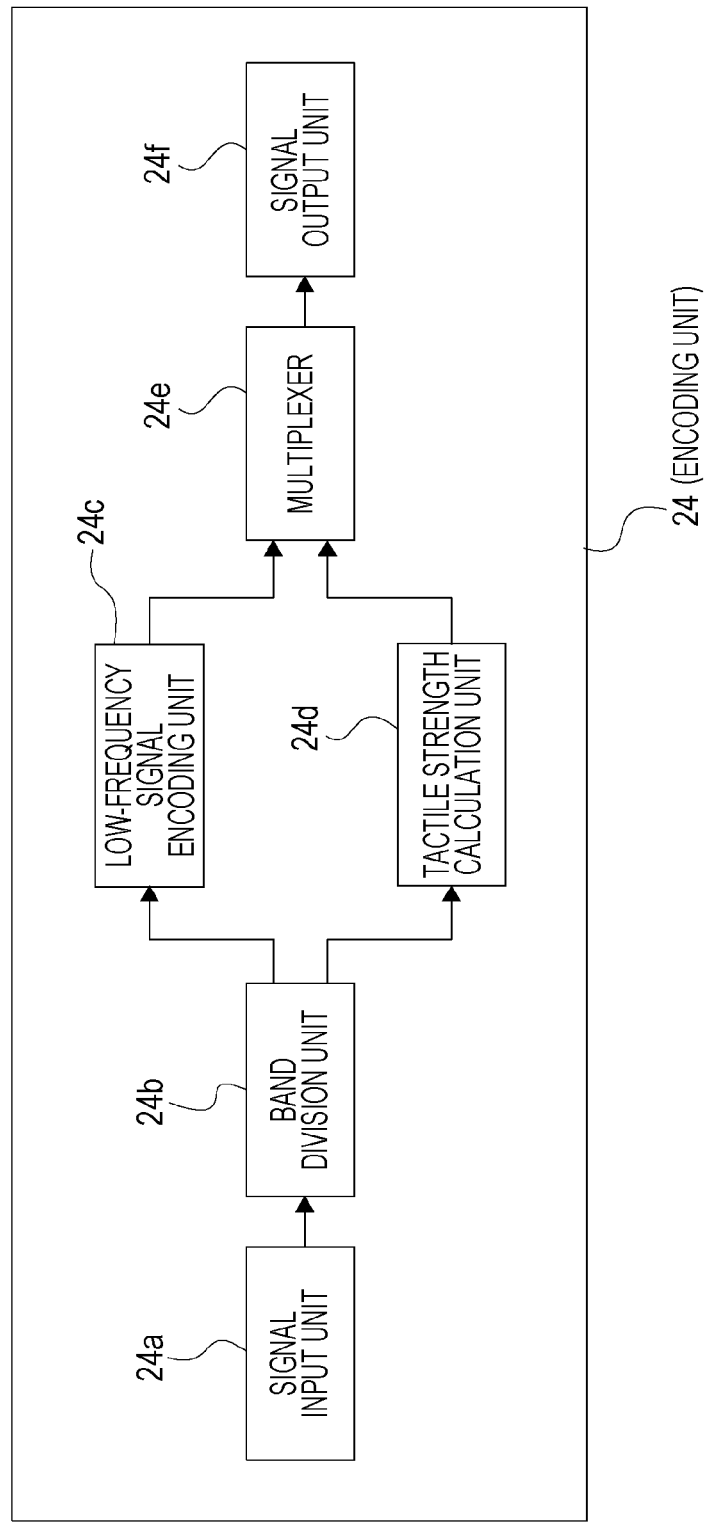
FIG. 7 is a functional block diagram illustrating the functions of the encoding unit in an embodiment.

FIG. 7 is a functional block diagram illustrating the functions of the encoding unit 24.

As illustrated, the encoding unit 24 includes a signal input unit 24a, a band division unit 24b, a low-frequency signal encoding unit 24c, a tactile strength calculation unit 24d, a multiplexer 24e, and a signal output unit 24f.

The signal input unit 24a receives, as an input, tactile signals of a predetermined number of channels by a fixed number of samples for each signal. The description below is given of a case where similar processing is performed for respective channels. Moreover, the tactile signal to be input is set to have a band of 2 kHz and a sampling frequency of 4 kHz.

The signal input unit 24a segments the input tactile signal into appropriate processing blocks (e.g., the number of samples for a time period of 5 milliseconds (ms)).

This segmented processing block is hereinafter referred to as a "frame". Each processing following the signal input unit 24a is performed in units of frames.

The band division unit 24b performs band division processing on the input signal from the signal input unit 24a. Specifically, the input signal is divided into low-frequency and high-frequency signals. Moreover, the division frequency regarding such band division processing is described later.

The low-frequency signal encoding unit 24c receives, as an input, the low-frequency signal obtained by being subjected to the band division processing in the band division unit 24b and performs encoding processing on the low-frequency signal using a predetermined encoding technique.

In this regard, the encoding technique for the low-frequency signal can employ various methods commonly used for encoding the audio signal, which is the same one-dimensional signal as the tactile signal. Examples can include MPEG-1 Audio Layer-III (MP3), advanced audio coding (AAC), or the like, as well as a free lossless audio codec (FLAC), which is a lossless encoding technique. In addition, adaptive differential pulse-code modulation (ADPCM) or the like can be employed considering resources for arithmetic operation.

As described above, the encoding technique for low-frequency signals employs, if possible, an encoding technique that maintains the signal waveform.

The tactile strength calculation unit 24d receives, as an input, the high-frequency signal obtained by the band division unit 24b and calculates a tactile intensity on the basis of the high-frequency signal.

Moreover, the tactile intensity is described later.

The multiplexer 24e receives, as an input, the encoded data of the low-frequency signal obtained by the low-frequency signal encoding unit 24c (hereinafter referred to as "encoded low-frequency data") and the tactile intensity calculated by the tactile strength calculation unit 24d. The multiplexer 24e encodes various types of information such as the encoded low-frequency data or the tactile intensity as a bitstream in accordance with an encoding data format of FIG. 11 described later. This encoding results in obtaining the encoded tactile data Dc.

The signal output unit 24f outputs the encoded tactile data Dc obtained in the multiplexer 24e.

The band division unit 24b is described in detail.

Figure 8:
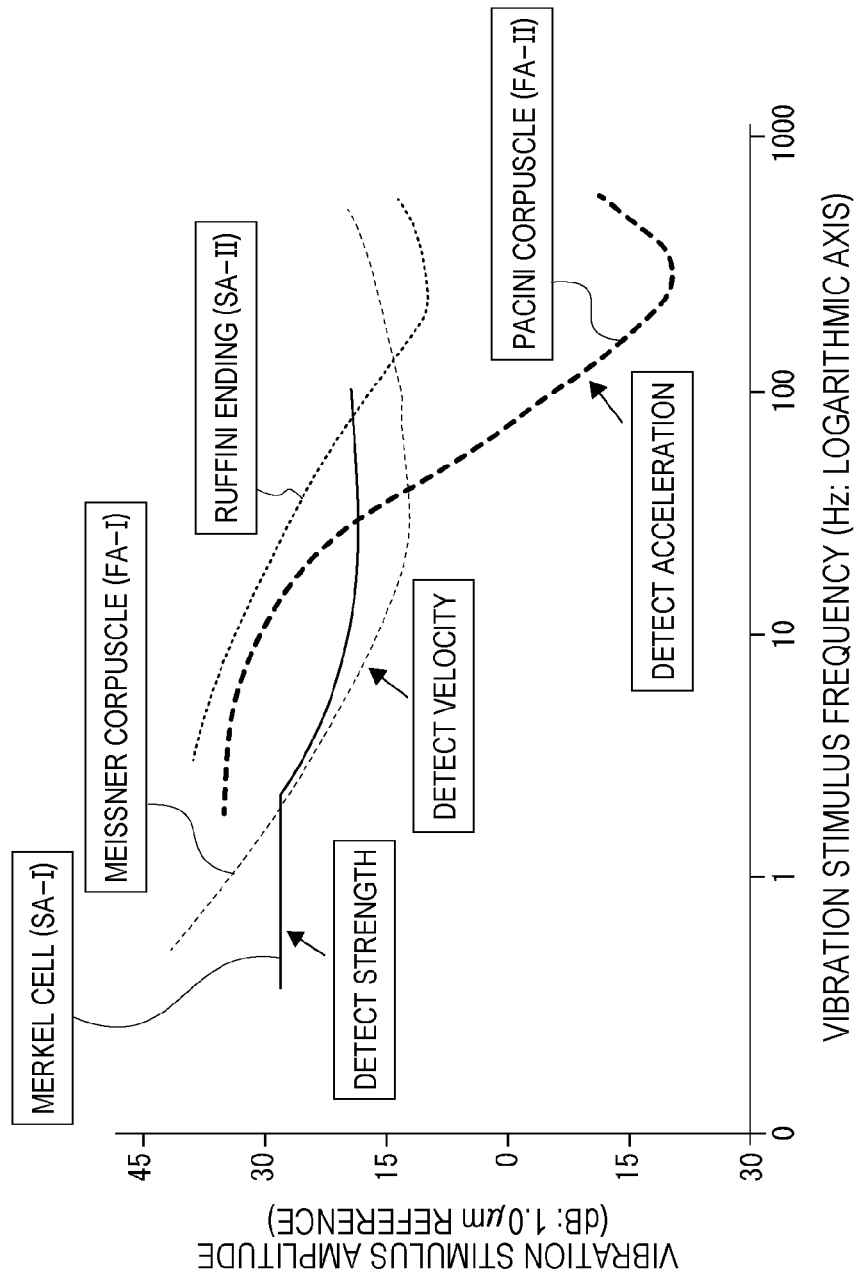
FIG. 8 is a diagram illustrating the tactile sensitivity characteristics of each sensory receptor of the human body.

FIG. 8 is a diagram illustrating the tactile sensitivity characteristics of each sensory receptor of the human body.

Four types of sensory receptors that allow the human body to feel tactile sensation, as illustrated in FIG. 8, are known. Meissner corpuscles among them are known as velocity detecting receptors and are highly sensitive to low variation in frequencies. Thus, frequency components from a few hertz (Hz) to approximately 100 Hz, in which Meissner corpuscles are most likely to be stimulated, are encoded to maintain their waveforms as much as possible. Accordingly, the band division unit 24b divides the tactile signal band into a low-frequency band of less than 100 Hz and a high-frequency band of 100 Hz or more.

Moreover, the division frequency used between the low-frequency band and the high-frequency band can be divided into any frequency depending on the case. Details are described later.

The tactile strength calculation unit 24d is now described.

For the human tactile sensation, the strength felt by the human body varies with frequency, which can be seen from vibration detection thresholds illustrated in FIG. 6. Such strength is quantified and modeled as a tactile intensity model, which has been reported in the art.

In this description, the tactile intensity (tactile strength) refers to the strength of the tactile sensation felt by the human body in applying a tactile stimulus of a given magnitude (amplitude).

Figure 9A:
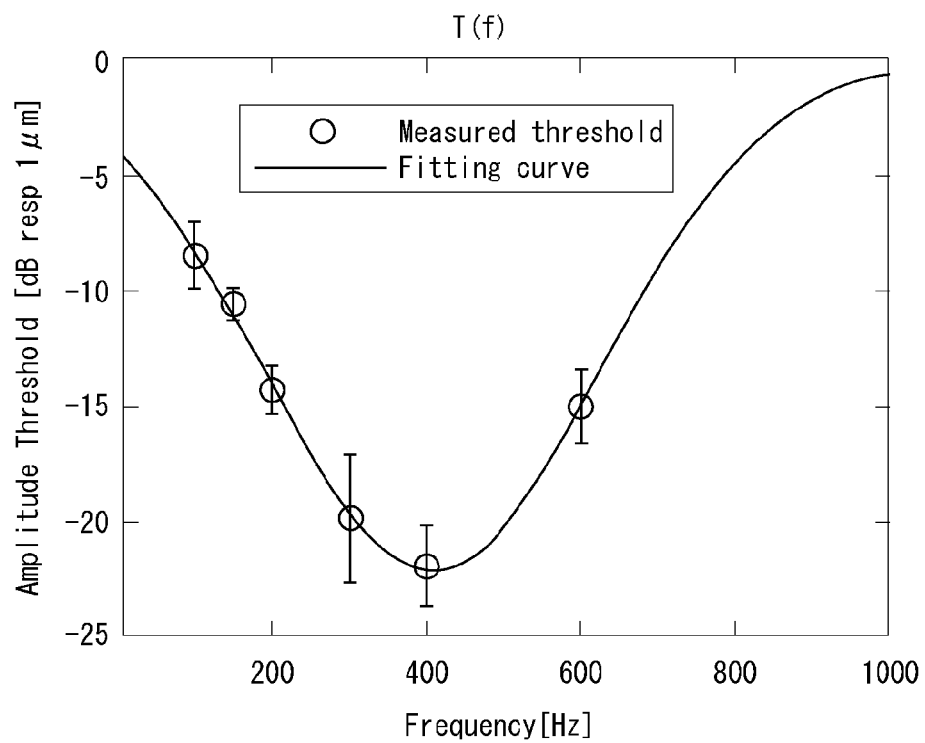
FIGS. 9A and 9B are diagrams illustrated to describe a tactile intensity.
Figure 9B:
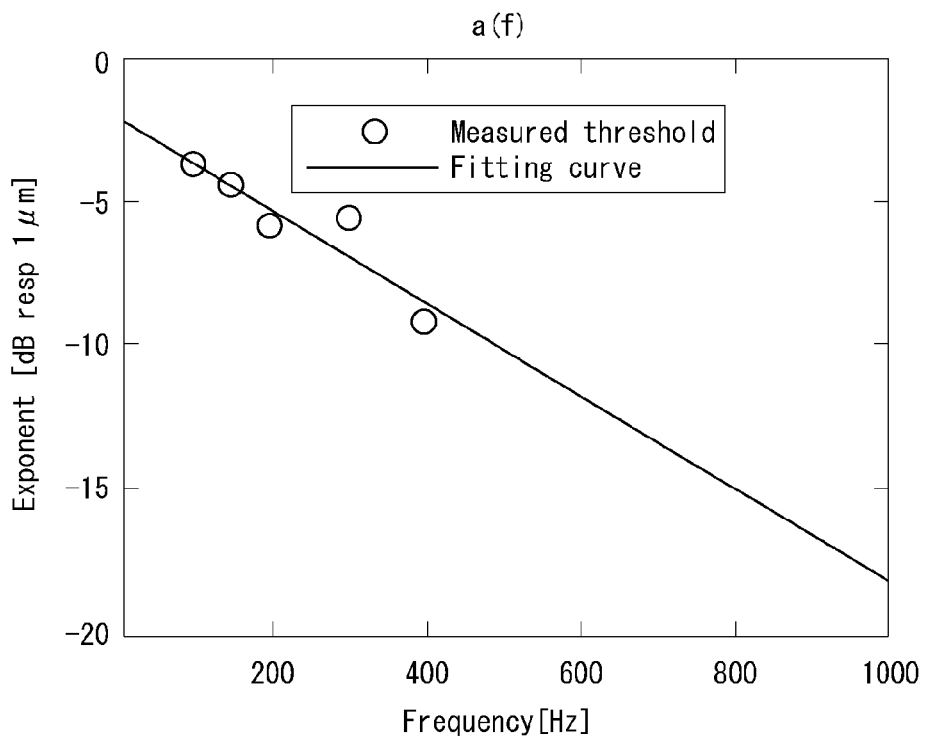

FIGS. 9A and 9B are diagrams illustrated to describe the tactile intensity, where FIG. 9A is a graph of T (f), and FIG. 9B is a graph of a (f). In this figure, T (f) means a vibration detection threshold T relative to a frequency f (e.g., threshold T is a vibration detection threshold described with reference to FIG. 6), and a (f) means a coefficient, a, relative to the frequency f.

From T(f), a(f), and an amplitude A(f) at the frequency f of the tactile signal, a tactile intensity I(f) at the frequency f is given by Formula (2) as follows:

[Math. 1]

$$I(f) = \left(\frac{A(f)^2}{T(f)^2}\right)^{a(f)} \qquad \text{Formula (2)}$$

A(f) is the amplitude of a signal at frequency f

In the case where the tactile intensities I are the same signals, even if their frequencies are different, the vibration strengths are felt equally. Furthermore, among the tactile receptors illustrated in FIG. 8, the Pacinian corpuscle is mainly known to be less sensitive to variation in vibration frequencies than to respond to variation in vibration strength. Thus, a perception that is equivalent to that of high frequencies of 100 Hz or higher, where the Pacinian corpuscle is most likely to be stimulated, can be obtained by following variation in the tactile intensity I.

Thus, for high-frequency signals of 100 Hz or higher, a value of the tactile intensity I(f) for each frequency is recorded rather than the waveform itself.

Moreover, a lower cut-off frequency at which its tactile intensity is to be calculated can be determined depending on the band division described above.

In calculating and recording the tactile intensity I for one frame, the tactile intensity I of the high-frequency signal in the tactile signal for one frame is given as the definite integral of the frequency f by Formula (3) as follows:

[Math. 2]

$$I = \int_{100}^{2000} I(f) \qquad \text{Formula (3)}$$

Considering the process mentioned above as digital signal processing, first, the input signal is subjected to the discrete Fourier transform to acquire a spectrum, and then the tactile intensity I(Fbin) for each frequency bin Fbin is given by Formula (4),
where AS(Fbin) is the amplitude spectrum value with respect to Fbin, and fFbin is the center frequency of Fbin, as follows:

[Math. 3]

$$I(Fbin) = \left(\frac{AS(Fbin)^2}{T(fFbin)^2}\right)^{a(f)} \qquad \text{Formula (4)}$$

Then, the tactile intensity I of the high-frequency signal is obtained by adding I(Fbin) from the minimum value FbinMin to the maximum value FbinMax of the frequency bin within the tactile intensity calculation range using Formula (5) as follows:

[Math. 4]

$$I = \sum_{FbinMin}^{FbinMax} I(Fbin) \qquad \text{Formula (5)}$$

Moreover, a representative tactile intensity is obtained for all frequencies from 100 Hz to 2 kHz in the above example, but if a major frequency that is important for tactile reproduction among the input signals is known, the tactile intensity I can be obtained only for the component of such major frequency.

The term "major frequency" used herein means the frequency at which the main spectrum can be obtained. The main spectrum means a spectrum excluding at least the spectrum as noise.

The description is given of an example of obtaining the major frequency using frequency analysis.

The input tactile signal is first subjected to the discrete Fourier transform to acquire a spectrum, and then the major frequency is determined by examining the peak of the amplitude spectrum of 100 Hz or higher.

Figure 10:
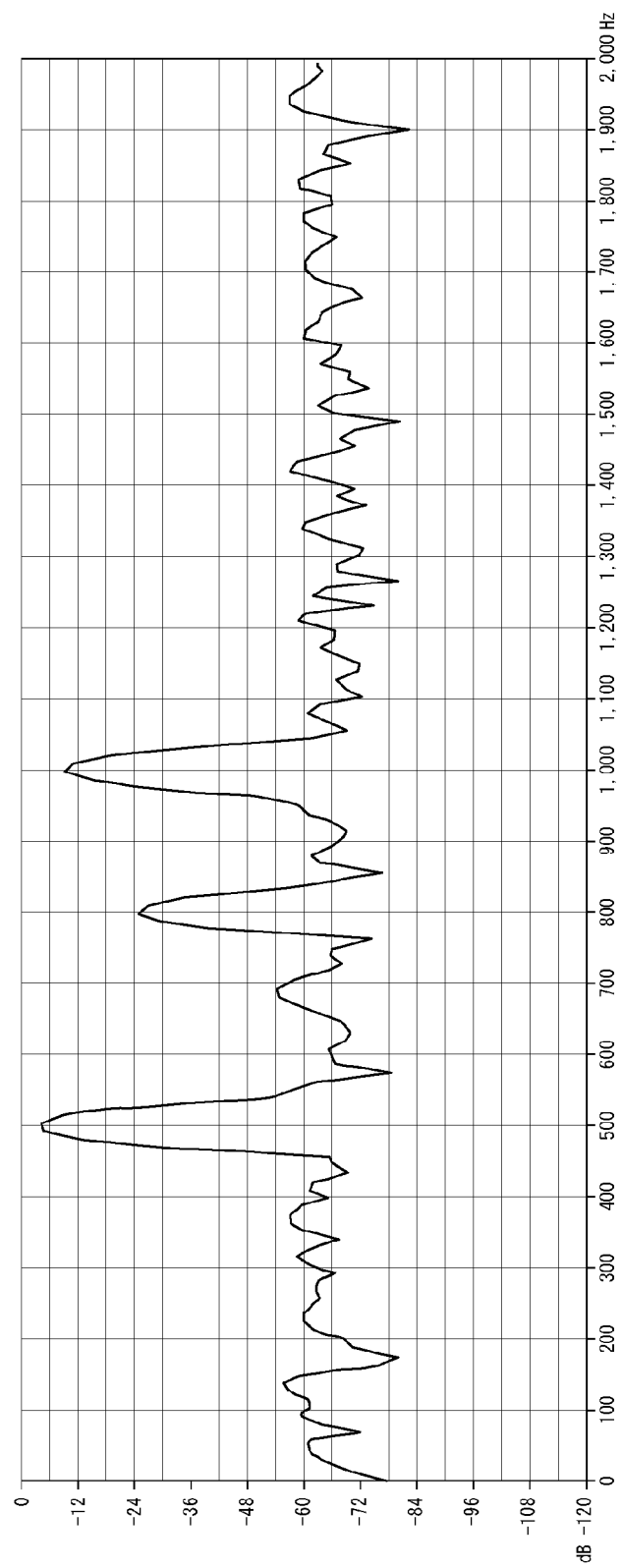
FIG. 10 is a diagram illustrated to describe a major frequency.

In one example, if peaks appear at the frequency components of 500 Hz, 800 Hz, and 1000 Hz, as illustrated in FIG. 10 by performing the Fourier transform, these frequency components of 500 Hz, 800 Hz, and 1000 Hz are specified as the major frequencies.

In this regard, the peak can be detected, for example, as a determination of whether or not the amplitude spectrum is equal to or higher than a predetermined threshold. Moreover, a way to detect the peak is not limited to this example and can employ, for example, various known techniques.

If the major frequency is specified, then the tactile intensity I of the high-frequency signal is calculated on the basis of the amplitude A of the major frequency. In one example, in the case where the major frequency is specified as illustrated in FIG. 10, the tactile intensity I is given by Formula (6) below:

[Math. 5]

$$I = \left(\frac{A(500)^2}{T(500)^2}\right)^{\alpha(500)} + \left(\frac{A(800)^2}{T(800)^2}\right)^{\alpha(800)} + \left(\frac{A(1000)^2}{T(1000)^2}\right)^{\alpha(1000)}$$

Formula (6)

On the other hand, if the major frequency is unspecified, the tactile intensity I of the high-frequency signal is given by Formula (5).

Figure 11:
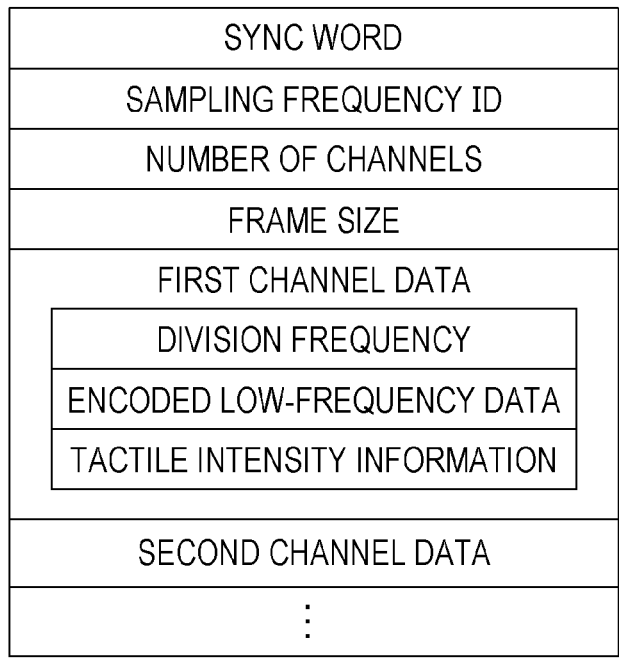
FIG. 11 is a diagram illustrated to describe an example of an encoding data format.

FIG. 11 is a diagram illustrating an example of a data format of the encoded tactile data Dc. Specifically, FIG. 11 illustrates a data format for one frame of encoded tactile data Dc.

In this format, the sync word is an identification code used to represent the beginning of the frame, and a pattern that is not included in other data as much as possible is stored for the sync word.

For a sampling frequency ID, a pattern ID of the sampling frequency of the tactile signal is recorded.

For the number of channels, the total number of tactile signals is recorded.

For frame size, the size of the encoded tactile data Dc for one frame is recorded in bytes.

For the first channel data, encoded data relating to the tactile signal of the first channel is stored. For the first channel data, the division frequency, encoded low-frequency data, and tactile intensity information are stored.

The division frequency is the frequency used by the band division unit 24b, and for example, a numerical value indicating the frequency [Hz] is stored for the division frequency.

For the encoded low-frequency data, the encoded data of the low-frequency signal encoded by the low-frequency signal encoding unit 24c is stored.

Figure 12:
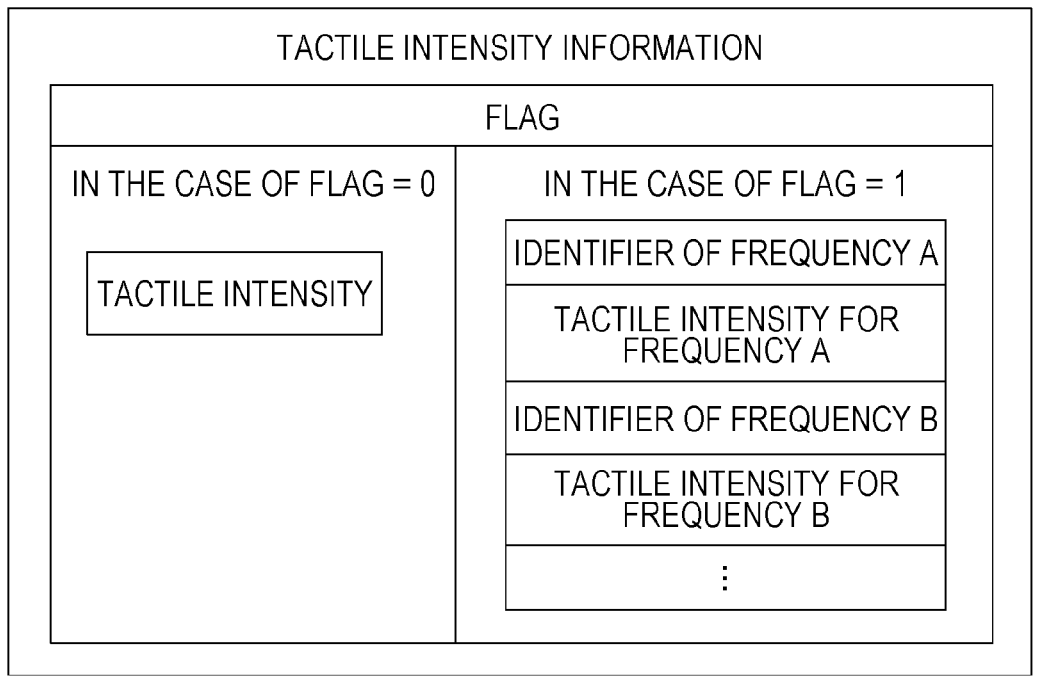
FIG. 12 is a diagram illustrated to describe an exemplary data structure of tactile intensity information.

The tactile intensity information is illustrated in detail in FIG. 12.

As illustrated, a flag has a storage area to store the tactile intensity information.

In one example, in the case where the major frequency is specified on the basis of the peak detection described above, that is, the case of limiting the frequency at which the tactile intensity is to be calculated, the flag is set to "1". An area following the flag stores information that includes an identifier of the frequency at which the tactile intensity is to be calculated (indicated as an identifier of frequency A and an identifier of frequency B in the figure) and the tactile intensity I for the frequency as a pair.

On the other hand, in the case where the major frequency is unspecified, and the specific frequency at which the tactile intensity is to be calculated is not limited, the flag is set to "0". In the following area, the tactile intensity I of each frequency (each frequency bin) in the high-frequency region (from the division frequency to the Nyquist frequency: 100 Hz to 2 kHz in this example) is stored. Moreover, for the tactile intensity I in the case of flag=0, a value for each frequency can be stored, or the total value of each frequency calculated in Formula (5) mentioned above can be stored.

For the second channel data, the encoded data relating to the tactile signal of the second channel is stored with the same specifications as the first channel data.

Other channels, if any, are added, and information is stored similarly.

Figure 13:
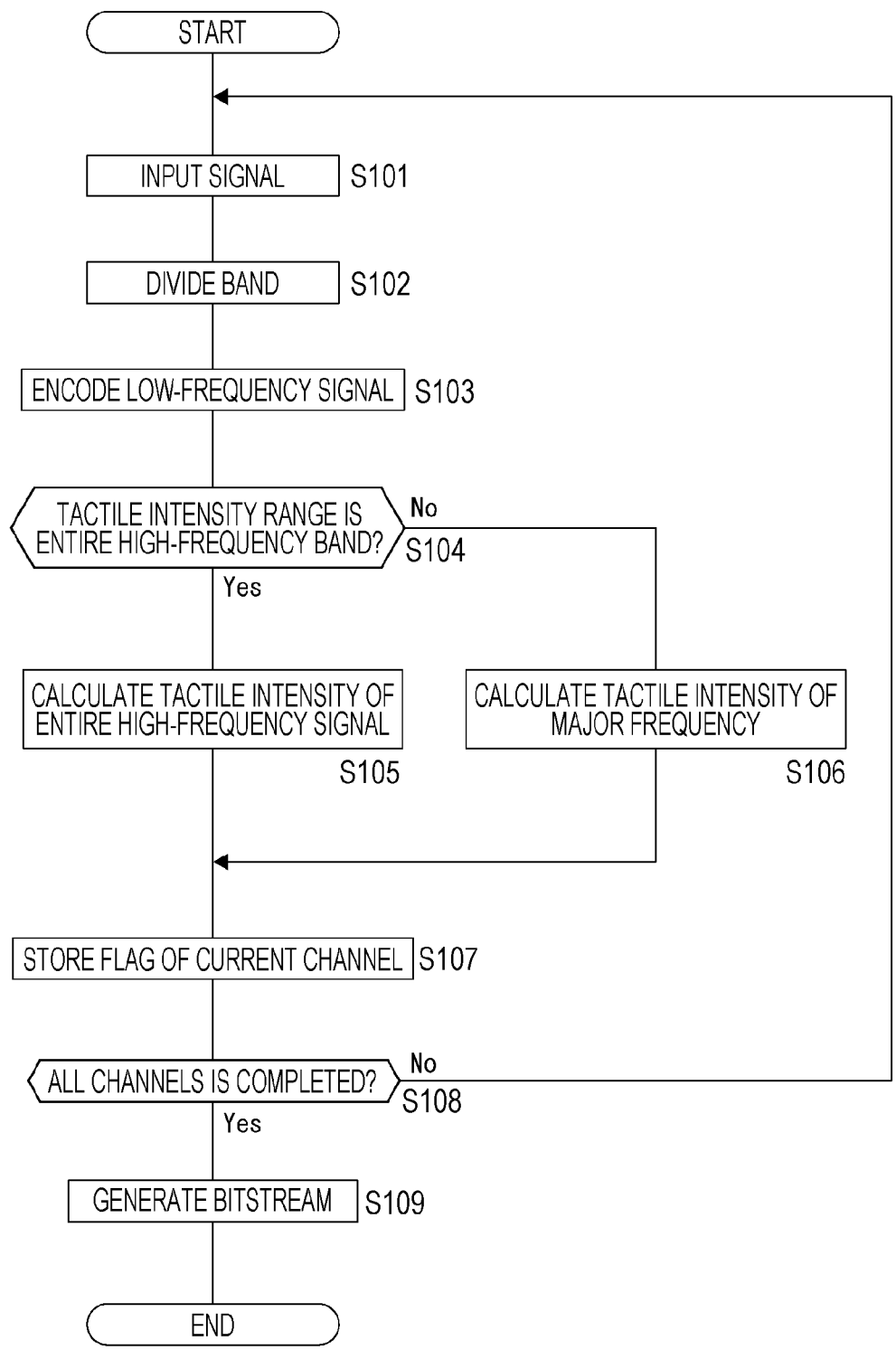
FIG. 13 is a flowchart illustrating an exemplary processing procedure for implementing an encoding technique according to an embodiment.

Referring to the flowchart in FIG. 13, an exemplary processing procedure for implementing the encoding technique according to the embodiment described above is described.

Moreover, this procedure shows an example in which the encoding unit 24 executes the processing for implementing the encoding technique according to the embodiment as software processing, but the entirety or a part of the processing described below can be implemented by hardware.

The processing of generating encoded tactile data Dc for one frame is illustrated in FIG. 13 and is repeatedly executed for each frame.

In step S101, first, the encoding unit 24 receives, as an input, a signal obtained by cutting out the tactile signal for one channel to be encoded by the number of samples for one frame.

In step S102 following step S101, the encoding unit 24 performs band division processing on the input signal using the division frequency to obtain low-frequency and high-frequency signals.

In step S103 following step S102, the encoding unit 24 encodes the low-frequency signal obtained by the band division processing in step 102 using a predetermined encoding technique, such as MP3, AAC, FLAC, or ADPCM described above, to generate encoded low-frequency data.

In step 104 following step S103, the encoding unit 24 determines whether or not the tactile intensity range is the entire high-frequency band. In other words, the determination is performed on whether or not the tactile intensity is calculated for the entire band of the high-frequency signal, specifically, whether or not the major frequency is specified as described above. This determination is based on the result obtained by analyzing the high-frequency signal obtained by the band division processing in step 102.

In step 104, for example, if the major frequency is unspecified and an affirmative result (Yes) is obtained that the tactile intensity range is the entire high-frequency band, then the processing proceeds to step 105. In this step, the encoding unit 24 calculates the tactile intensity of the entire high-frequency signal band (see Formula (5) expressed above), and then the processing proceeds to step S107.

On the other hand, in step 104, for example, if the major frequency is specified and a negative result (No) is obtained that the tactile intensity range is not the entire high-frequency band, the processing proceeds to step 106. In this step, the encoding unit 24 calculates the tactile intensity of the major frequency (see Formula (6) expressed above), and then the processing proceeds to step S107. Meanwhile, the encoding unit 24 stores an identifier of the specified major frequency if the major frequency is specified.

In step S107, the encoding unit 24 stores the flag of the current channel (the channel being currently processed). Specifically, if the affirmative result is obtained that the tactile intensity range is the entire high-frequency band in step S104, the encoding unit 24 stores "0" as the flag of the current channel, and if not, the encoding unit 24 stores "1" as the flag of the current channel.

In step S108 following step S107, the encoding unit 24 determines whether or not the processing for all channels is completed, that is, whether or not the processing from steps S101 to S107 for all the channels of the tactile signal is completed.

If the processing for all the channels is uncompleted, the processing in the encoding unit 24 returns to step S101. This returning allows similar processing for one frame to be executed for the next channel.

On the other hand, if the processing for all the channels is completed, the encoding unit 24 executes bitstream generation processing in step S109 and then ends the series of processing steps illustrated in FIG. 13.

In the bitstream generation processing of step S109, multiplexing is performed in accordance with the encoding data format described referring to FIGS. 11 and 12 to generate a bitstream for the encoded tactile data Dc.

Moreover, although the above example of specifying the major frequency by peak detection is given, the major frequency can also be specified by using a deep neural network (DNN).

Its specific example is described with reference to FIG. 14.

Figure 14:
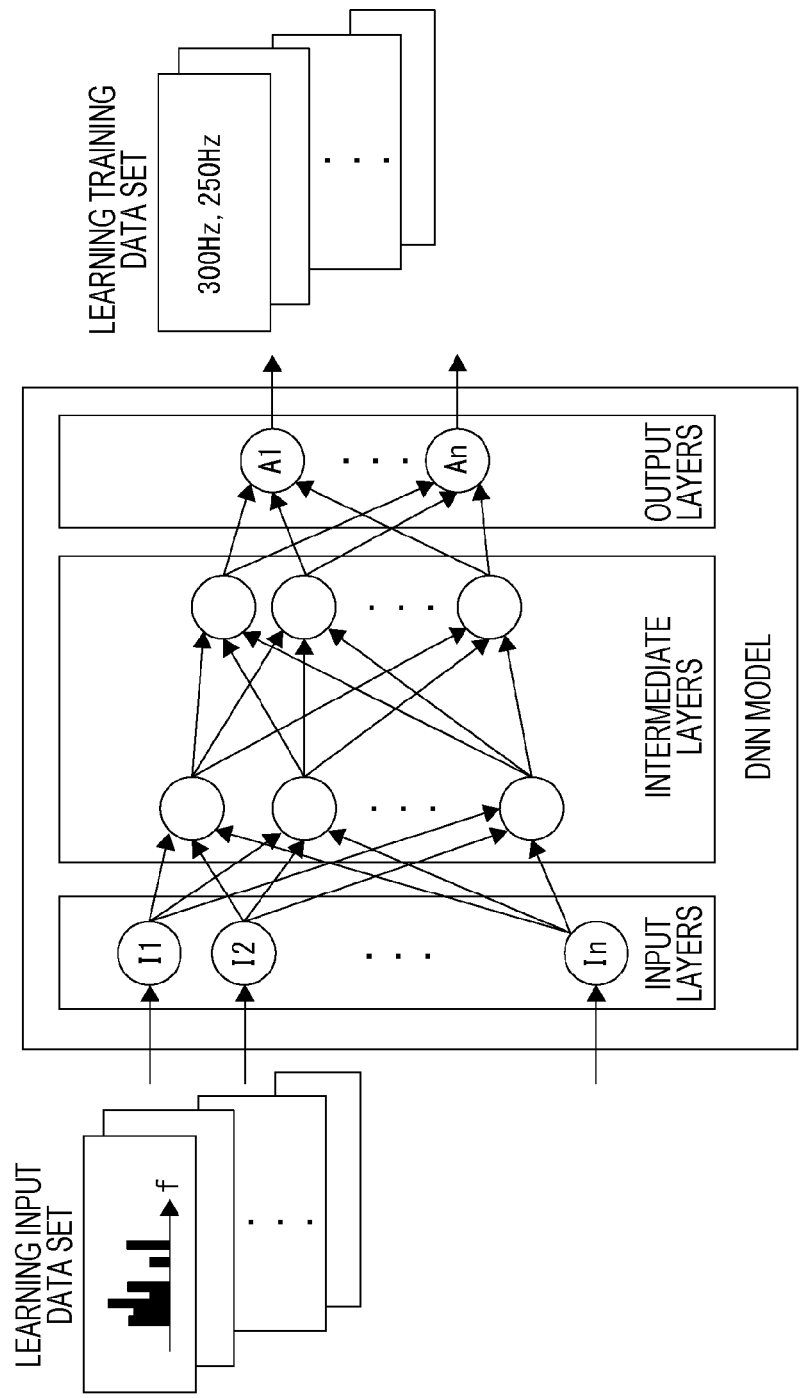
FIG. 14 is a diagram illustrated to describe an example of a machine learning technique in a case of using a DNN model to specify a major frequency.

FIG. 14 illustrates a DNN model in which supervised learning is performed in advance using a learning data set. For the learning data set, a learning input data set is used as the learning input signal.

The learning input data set is the amplitude spectrum of the tactile signal. In the DNN model, input layers I1 to In are the center frequencies of respective frequency bins, and the input is the amplitude spectrum value of each frequency bin.

In the DNN model, output layers A1 to An are combinations of major frequencies for tactile reproduction, and the learning training data set is a supervised data set corresponding to each data of the learning input data set and is a pre-labeled combination of major frequencies for tactile reproduction.

In learning the DNN model, the weight coefficient of each edge of the DNN model is updated by the probability (likelihood) of the output layers A1 to An upon inputting the learning input data and the error backpropagation of the learning training data.

In specifying the major frequency from the actual tactile signal using the DNN model learned in the way described above, the input tactile signal (high-frequency signal) is discrete Fourier transformed and then converted into a spectrum. Then, the amplitude spectrum is input to the learned DNN model, and the output (frequency combination pattern) having the highest likelihood among the output layers A1 to An is used.

[6-3. Decoding Technique]

Figure 15:
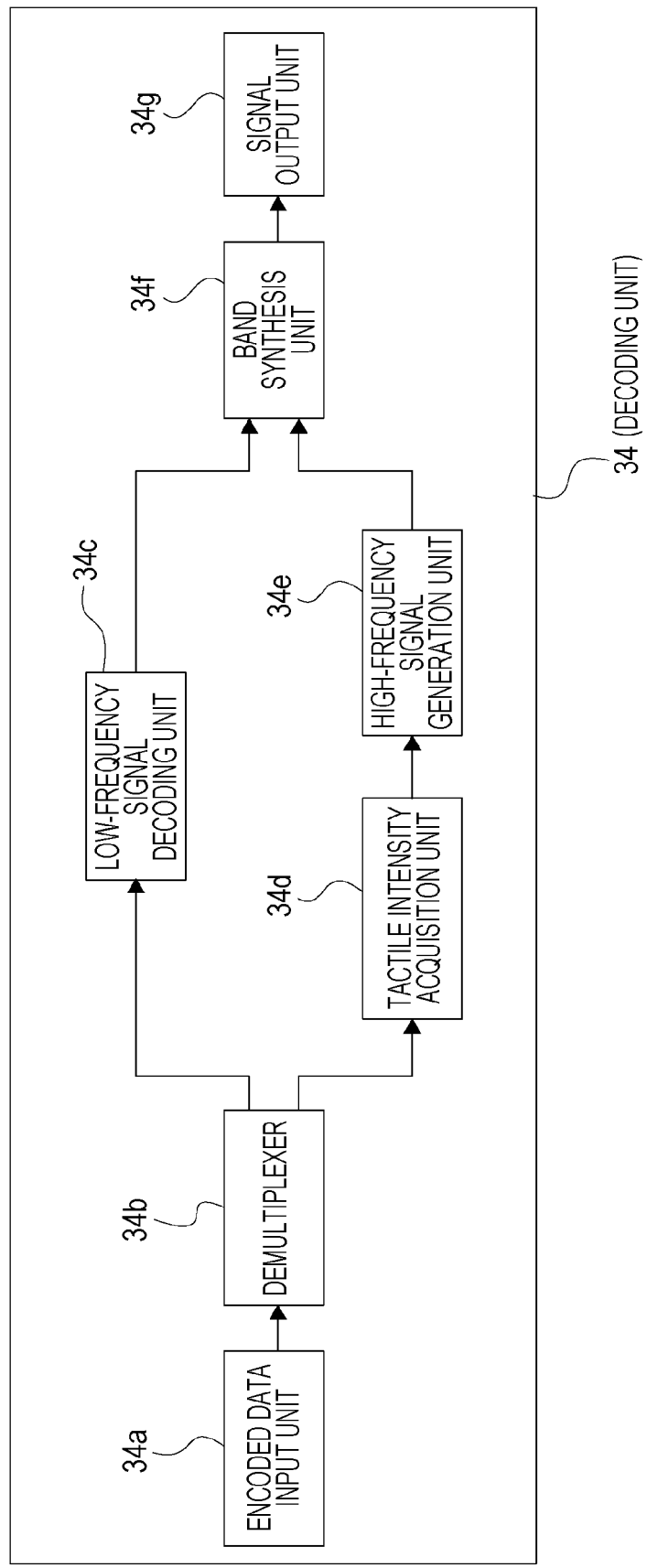
FIG. 15 is a functional block diagram illustrating a function of a decoding unit according to an embodiment.

FIG. 15 is a functional block diagram illustrating the functions of the decoding unit 34.

As illustrated, the decoding unit 34 includes an encoded data input unit 34a, a demultiplexer 34b, a low-frequency signal decoding unit 34c, a tactile intensity acquisition unit 34d, a high-frequency signal generation unit 34e, a band synthesis unit 34f, and a signal output unit 34g.

The encoded data input unit 34a receives, as an input, the encoded tactile data Dc for one frame. Moreover, the beginning of one frame can be detected from the sync word mentioned earlier.

The demultiplexer 34b performs demultiplexing in accordance with the encoding data format illustrated in FIGS. 11 and 12 to acquire various types of information stored in the encoded tactile data Dc.

The low-frequency signal decoding unit 34c decodes the encoded low-frequency signal data acquired by the demultiplexer 34b to obtain a low-frequency signal.

The tactile intensity acquisition unit 34d performs flag value determination processing or performs tactile intensity acquisition processing depending on the determined flag value, on the basis of the tactile intensity information acquired by the demultiplexer 34b.

The high-frequency signal generation unit 34e generates a high-frequency signal on the basis of the tactile intensity acquired by the tactile intensity acquisition unit 34d. Moreover, the way to generate the high-frequency signal is described later.

The band synthesis unit 34f synthesizes the low-frequency signal obtained by the low-frequency signal decoding unit 34c and the high-frequency signal obtained by the high-frequency signal generation unit 34e.

The signal output unit 34g outputs a tactile signal obtained by the synthesis in the band synthesis unit 34f.

The description is given of the processing in the high-frequency signal generation unit 34e.

The processing in the high-frequency signal generation unit 34e varies depending on the value in the flag.

In the case of flag=0, the tactile intensity for the entire high-frequency signal band is obtained, and a periodic signal with any optional frequency fx in the high-frequency band is generated as a high-frequency signal on the basis of the tactile intensity for the entire band.

In this description, the periodic signal means a signal with amplitude changing in a predetermined period (temporal signal), and examples thereof include a sine wave signal or the like.

In the case of flag=0, the high-frequency signal generation unit 34e generates a high-frequency signal on the basis of the tactile intensity I of the high-frequency signal, that is, the total value of the tactile intensities calculated for each frequency in the high-frequency band.

Specifically, an amplitude A(fx) can be calculated from the obtained tactile intensity I and any optional frequency fx on the basis of Formula (2), so a high-frequency signal $S1(t)$ in this case is given by Formula (7) below:

[Math. 6]

$$S1(t) = T(fx) \cdot I^{\frac{1}{2 \cdot a(fx)}} \sin 2 \cdot \pi \cdot fx \cdot t \qquad \text{Formula (7)}$$

As described above, in the case of flag=0, the high-frequency signal generation unit 34e converts the tactile intensity into the signal amplitude and generates the periodic signal as the high-frequency signal. The periodic signal has the converted signal amplitude and has the signal frequency being the frequency fx in the high-frequency band.

In this example, in the case of flag=0, the optional frequency fx can be uniquely determined in advance in the decoding unit 34.

In one example, the frequency fx can be considered to be set to a frequency that substantially matches the resonance frequency of the tactile presentation device 6. The term "substantial match" used herein is a concept including numerical values within the range considered to be the same. It refers to values belonging to the frequency range from the preceding end side frequency to the posterior end side frequency of the peak portion centered on the resonance frequency in the frequency characteristic curve of the tactile presentation device 6, for example.

Setting the frequency fx to a frequency that substantially matches the resonance frequency of the tactile presentation device 6 makes it possible to improve the driving efficiency of the tactile presentation device, achieving the power saving of the tactile presentation device 6.

Further, the frequency fx can also be set on the basis of the tactile sensitivity characteristics of the human body. Specifically, it is conceivable that the frequency fx is set to a frequency at which the tactile sensitivity is equal to or higher than a predetermined value.

This makes it possible to set the frequency fx to a frequency with high tactile sensitivity for the human body, resulting in the efficiency of driving the tactile presentation device 6. Thus, it is possible to achieve the power saving of the tactile presentation device 6.

Further, the frequency fx can also be set on the basis of the auditory sensitivity characteristics of the human body. Specifically, it is conceivable that the frequency fx is set to a frequency at which the auditory sensitivity is equal to or lower than a predetermined value.

This makes it possible to set the frequency fx to a frequency with low auditory sensitivity for the human body, resulting in the reduction in the noise occurring by driving the tactile presentation device 6. Thus, it is possible to enhance the user's immersion in the tactile content.

The processing in the case of flag=1 is described.

In the case of flag=1, the tactile intensity acquisition unit 34d obtains the major frequency and the tactile intensity for the major frequency.

In this case, the high-frequency signal generation unit 34e generates a high-frequency signal on the basis of the tactile intensity to the major frequency.

Specifically, for example, in the case where the major frequencies are a frequency A and a frequency B, a high-frequency signal S2 is given on the basis of (fa) of the frequency A, a tactile intensity (I(fa)) to the frequency A, (fb) of the frequency B, and a tactile intensity (I(fb)) to the frequency B, as Formula (8) below:

[Math. 7]

$$S2(t) = T(fa) \cdot I(fa)^{\frac{1}{2 \cdot a(fa)}} \sin 2 \cdot \pi \cdot fa \cdot t + T(fb) \cdot I(fb)^{\frac{1}{2 \cdot a(fb)}} \sin 2 \cdot \pi \cdot fb \cdot t \quad \text{Formula (8)}$$

Figure 16:
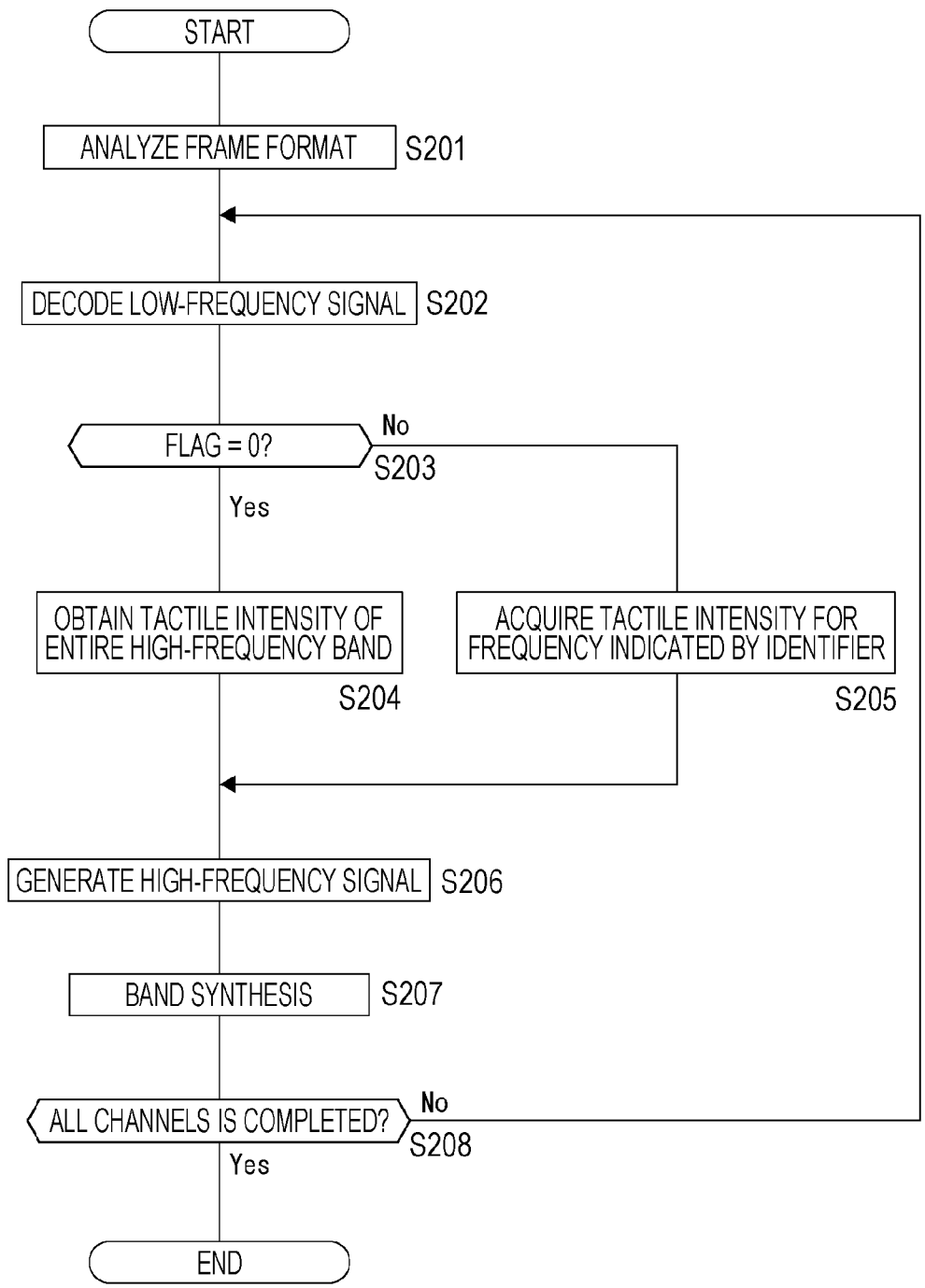
FIG. 16 is a flowchart illustrating an exemplary processing procedure for implementing a decoding technique according to an embodiment.

Referring to the flowchart in FIG. 16, the description is given of an exemplary processing procedure for implementing the decoding technique according to the embodiment described above.

There is now given an example in which the decoding unit 34 executes the processing for implementing the decoding technique according to the embodiment using software processing, similarly to the case of encoding. However, the entirety or a part of the processing described below can also be implemented by hardware.

The processing illustrated in FIG. 16 is to decode a bitstream for one frame (the encoded tactile data Dc) to obtain a tactile signal and is repeatedly executed on a frame-by-frame basis.

In step S201, first, the decoding unit 34 analyzes the encoded tactile data Dc for one frame in accordance with the encoding data format. This analysis processing allows a sampling frequency to be specified from the sampling frequency ID, obtaining the number of channels, the frame size, and each channel data.

In step 202 following step S201, the decoding unit 34 decodes the encoded low-frequency data included in the targeted channel data to obtain a low-frequency signal.

In step 203 following step S202, the decoding unit 34 determines whether or not the value of the flag included in the targeted channel data is 0.

If the flag=0, the processing in the decoding unit 34 proceeds to step S204 to obtain the tactile intensity of the entire high-frequency band included in the targeted channel data and proceeds to step S206.

On the other hand, if the flag is not 0, the processing proceeds to step 205, and the decoding unit 34 acquires a frequency identifier for the major frequency included in the targeted channel data and a tactile intensity for the major frequency. Then, the processing proceeds to step S206.

In step S206, the decoding unit 34 performs high-frequency signal generation processing. In other words, in the case of flag=0, the high-frequency signal is generated by Formula (7) above on the basis of the tactile intensity of the entire high-frequency band acquired in step S204. On the other hand, in the case of flag=1, a high-frequency signal is generated by Formula (8) above on the basis of the frequency identifier of the major frequency and the tactile intensity acquired in step S205.

In step S207 following step S206, the decoding unit 34 performs band synthesis processing of synthesizing the low-frequency signal obtained in step S202 and the high-frequency signal obtained in step S206.

Then, in step S208, the decoding unit 34 determines whether or not the processing for all channels is completed and, if the processing for all channels is uncompleted, returns to step S202. This returning allows the processing from steps S202 to S207 to be executed for the next channel. On the other hand, if the processing for all channels is completed, the decoding unit 34 ends the series of processing steps illustrated in FIG. 16.

In this regard, the description above is given of the example of setting a predetermined frequency as the frequency fx in a case where the flag=0, but the frequency fx can also be set in response to the operation.

In one example, the decoding unit 34 can set the frequency fx in response to the operation input through the operation unit 38 illustrated in FIG. 4.

Figure 17:
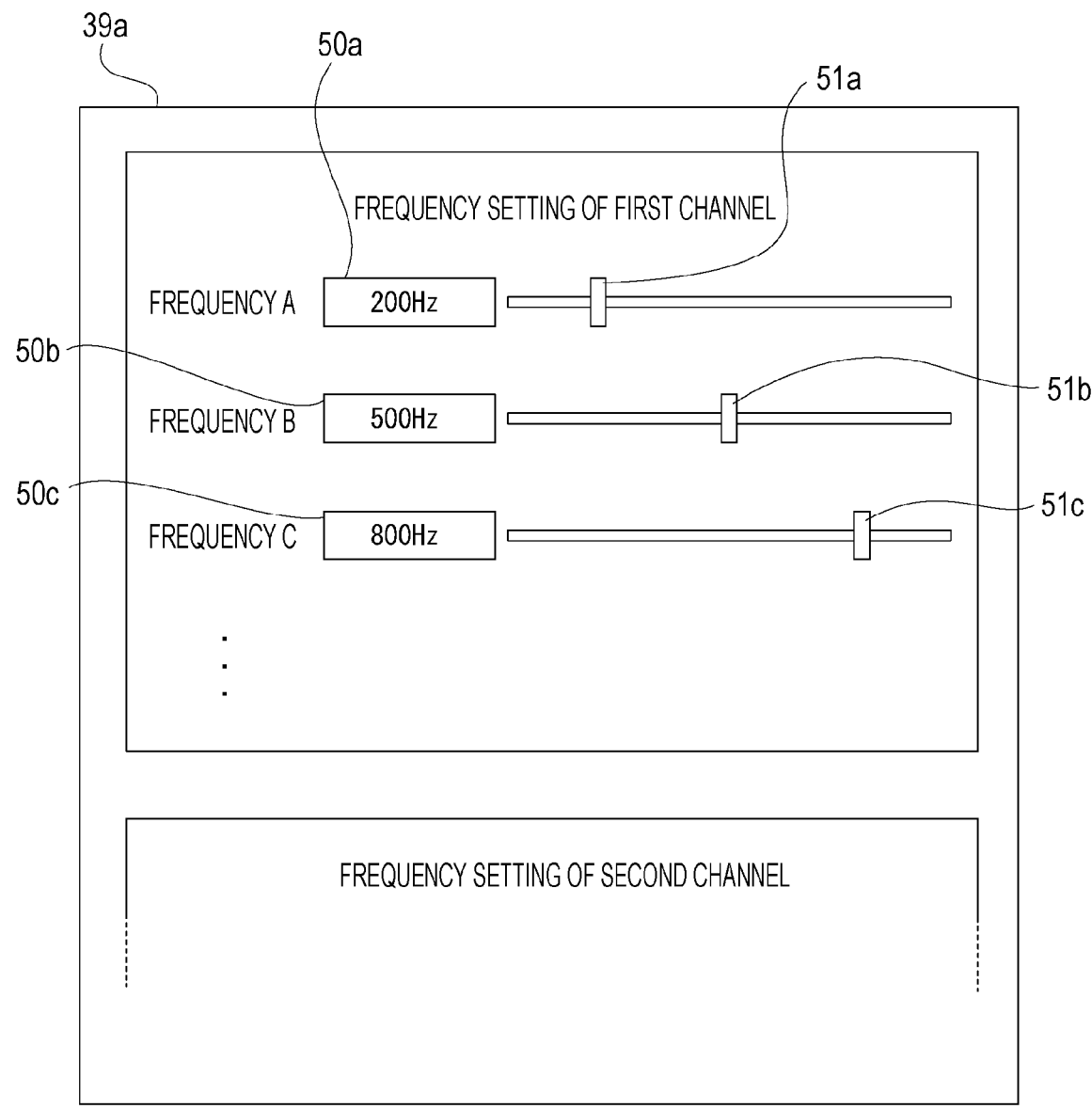
FIG. 17 is a diagram illustrated to describe an example of setting the frequency of a periodic signal in response to an operation.

FIG. 17 illustrates an example of a graphical user interface (GUI) regarding the setting of frequency fx.

FIG. 17 exemplifies a GUI allowing for setting a plurality of frequencies rather than a single frequency as the frequency fx.

In this case, a setting screen, as illustrated, is displayed on a screen 39a of the display unit 39 to receive the setting operation of the frequency fx. A frequency setting area for each channel of the tactile signal is provided on this setting screen. In the frequency setting area of each channel, is provided a frequency display window 50 (in the figure, display windows 50a, 50b, and 50c for respective corresponding frequencies A, B, and C) and a slider 51 (in the figure, sliders 51a, 51b, and 51c for respective corresponding frequencies A, B, and C) for a plurality of frequencies to be set. The slider is used to specify a numeric value of the frequency.

When the user changes the position of the slider 51, the numerical value in the frequency display window 50 corresponding to the slider 51 changes. This arrangement makes it possible for the user to specify any optional frequency by operating the slider 50 while checking the numerical value displayed in the frequency display window 50.

In this example, in the case of setting a plurality of frequencies fx, the decoding unit 34 generates, for example, a periodic signal for each of those frequencies and generates a high-frequency signal by synthesizing the generated periodic signals.

In this case, the tactile intensity of each frequency in the high-frequency band is premised to be stored as the tactile intensity information in the case of flag=0 in the encoded tactile data Dc. Then, the decoding unit 34 performs calculations similar to Formula (8) above on the basis of set respective frequencies fx and each tactile intensity at those frequencies fx in the high-frequency signal generation processing to generate the high-frequency signal.

Moreover, the example above is to set the frequency fx of the periodic signal on the basis of the operation input through the operation unit 38 provided in the decoder 3. However, it is also possible to set the frequency fx on the basis of an operation input through an operation unit provided in a device other than the decoder 3. In one example, a way to install an operation unit in the playback device 4 and to set the frequency of the periodic signal in response to the operation input to the playback device 4 is conceivable.

[6-4. Control of Division Frequency Depending on Communication Stability]

In this regard, the description above is given of the example in which the division frequency between the low-frequency band and the high-frequency band is fixed in the band division processing upon encoding, but the division frequency can also be variable.

It is conceivable that the division frequency increases upon intending to reproduce a low-frequency signal with higher quality, and the division frequency decreases upon intending to reduce the amount of encoded tactile data Dc. In one example, in the case where communication stability deteriorates, such as deterioration in the radio wave condition during communication, it is conceivable to dynamically change the division frequency as QoS by lowering the signal quality to improve communication stability.

In this connection, the communication stability means an index regarding the stability of communication. Examples can include communication rate (communication bit rate), a value indicating latency such as ping value (round-trip time of communication until a response packet is returned from the communication partner), radio wave strength in wireless communication, packet loss rate in packet communication, and the like.

An example of changing the division frequency depending on the communication stability is described with reference to FIGS. 18A, 18B, and 18C.

In FIGS. 18A, 18B, and 18C, a transmission buffer refers to a buffer for transmission by the communication unit 27 in the encoder 2. Upon transmitting the encoded tactile data Dc obtained by the encoding unit 24 to an external device, the encoded tactile data Dc is buffered in the transmission buffer sequentially on a packet-by-packet basis.

In this example, the communication stability is determined on the basis of the number of empty slots in this transmission buffer. Specifically, if a large amount of packet data is accumulated in the transmission buffer, the communication state deteriorates, and a data retransmission request is sent many times from the receiving device side (the receiving side of the encoded tactile data Dc, e.g., the playback device 4). Thus, the situation can be determined that the transmission is not proceeding seamlessly. In other words, it can be determined that the communication stability is low (deteriorated).

FIGS. 18A, 18B, and 18C illustrate the division frequency corresponding to each of the cases where the communication stability is normal (FIG. 18A), good (FIG. 18B), and bad (FIG. 18C). The low-frequency band determined by the division frequency is a band in which the waveform is encoded almost as it is, so it can be called a quality-oriented encoding range. Meanwhile, the high-frequency band is a band that uses only tactile intensity as a substitute for the waveform itself, so it can be called an efficiency-oriented encoding range.

In other words, in the case where the communication stability is good or satisfactory, data interruption is less liable to occur even if the bit rate is high, so the division frequency is set high (e.g., 500 Hz) to widen the quality-oriented encoding range (low-frequency band) as much as possible and improve the quality. Meanwhile, in the case where the communication stability is bad or deteriorated, with an emphasis on preventing data interruption, the division frequency is set low (e.g., 100 Hz) to widen the efficiency-oriented encoding range (high-frequency band) and lower the bit rate.

In the case of setting the division frequency to be variable depending on the communication stability as described above, the encoding unit 24 performs communication stability determination processing (e.g., determination of three states of good, normal, and bad) and division frequency setting processing depending on a result obtained by the determination on the basis of the number of empty slots in the transmission buffer in the communication unit 27 in the band division processing of step S102 illustrated in FIG. 13.

<7. Summary of Embodiments>

As described above, a decoder (the decoder 3) as an embodiment includes a first decoding unit (low-frequency signal decoding unit 34*c*) configured to, for encoded data (encoded tactile data Dc) obtained by encoding a tactile signal, decode a first band signal being a signal of a first frequency band in the tactile signal, the encoded data including data obtained by encoding the first band signal and tactile strength information indicative of a tactile strength (tactile intensity) for a second frequency band different from the first frequency band in the tactile signal, a second decoding unit (high-frequency signal generation unit 34*e*) configured to decode a second band signal being a signal of the second frequency band in the tactile signal on the basis of the tactile strength information in the encoded data, and a synthesis unit (band synthesis unit 34*f*) configured to synthesize the first band signal decoded by the first decoding unit and the second band signal decoded by the second decoding unit.

This configuration makes it possible to decode the tactile signal relating to the second frequency band, for the encoded data generated by the encoder according to an embodiment while reducing or preventing the deterioration of the tactile reproducibility.

Thus, it is possible to reduce the amount of tactile signal data while reducing or preventing the tactile reproducibility from deteriorating.

Further, in the decoder according to an embodiment, the first frequency band is set to be a band in the lower frequency range than the second frequency band.

For the tactile signal in the band of a predetermined frequency or more, the human body perceives a variation in tactile strengths relatively with ease but perceives a variation in frequencies relatively with difficulty.

Thus, the configuration above makes it possible to implement information compression of the tactile signal using such tactile sensitivity characteristics of the human body, resulting in reducing the amount of data of the tactile signal while reducing or preventing the reproducibility of the tactile sensation from deteriorating.

Further, in the decoder as an embodiment, the tactile strength information is calculated for each frequency in the second frequency band, and the second decoding unit decodes the second band signal on the basis of a total value of the tactile strengths indicated by the tactile strength information calculated for each frequency (see steps S204 to S206 in FIG. 16).

This configuration makes it possible to reproduce, as the tactile strength of the second frequency band, an appropriate tactile strength based on the tactile strength of each frequency in the second band signal before encoding.

Thus, it is possible to reduce or prevent the tactile reproducibility from deteriorating.

Furthermore, in the decoder as an embodiment, the tactile strength information is calculated for one or more major frequencies in the second frequency band, and the second decoding unit decodes the second band signal on the basis of the tactile strength indicated by the tactile strength information calculated for the major frequency (see steps S205 to S206 in FIG. 16).

This configuration makes it possible to reproduce, as the tactile strength of the second frequency band, an appropriate tactile strength based on the tactile strength of the major frequency in the second band signal before encoding.

Thus, it is possible to reduce or prevent the tactile reproducibility from deteriorating.

Further, in the decoder as an embodiment, the second decoding unit converts the tactile strength indicated by the tactile strength information into a signal amplitude and generates a periodic signal having the converted signal amplitude as a decoded signal of the second band signal, the periodic signal having a signal frequency set to a frequency in the second frequency band (see Formula (7)).

This configuration makes it possible to decode the second band signal to reduce or prevent the deterioration of the tactile reproducibility, for the encoded data generated by the encoder according to the present technology.

Thus, it is possible to reduce the amount of tactile signal data while reducing or preventing the tactile reproducibility from deteriorating.

Furthermore, in the decoder as an embodiment, the periodic signal has the frequency substantially matching a resonance frequency of a tactile presentation device.

This configuration enables the efficiency of driving the tactile presentation device to be improved.

Thus, it is possible to achieve power saving in the tactile presentation device.

Furthermore, in the decoder as an embodiment, the periodic signal has the frequency set on the basis of tactile sensitivity characteristics of a human body.

This configuration makes it possible to set the frequency of the periodic signal to a frequency with high tactile sensitivity of the human body, improving the efficiency of driving the tactile presentation device.

Thus, it is possible to achieve power saving in the tactile presentation device.

Further, in the decoder as an embodiment, the periodic signal has the frequency set on the basis of auditory sensitivity characteristics of a human body.

This configuration makes it possible to set the frequency of the periodic signal to a frequency with low auditory sensitivity of the human body, reducing the noise occurring by driving the tactile presentation device.

Thus, it is possible to enhance the user's immersion in the tactile content.

Further, in the decoder as an embodiment, the second decoding unit sets the frequency of the periodic signal on the basis of an operation (see FIG. 17).

This configuration makes it possible for the user to select the frequency of the periodic signal optionally.

Further, a decoding method as an embodiment includes a first decoding step of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal, a second decoding step of decoding a second band signal being a signal of the second frequency band in the tactile signal on the basis of the tactile strength information in the encoded data, and a synthesis step of synthesizing the first band signal decoded in the first decoding step and the second band signal decoded in the second decoding step.

Even such a decoding method can achieve operations and effects similar to those obtained by the decoder according to the embodiments described above.

Further, an encoder as an embodiment includes a band division unit (band division unit 24b) configured to divide a tactile signal into a first band signal being a signal of a first frequency band and a second band signal being a signal of a second frequency band different from the first frequency band, a first encoding unit (low-frequency signal encoding unit 24c) configured to encode the first band signal, a tactile strength calculation unit (tactile strength calculation unit 24d) configured to calculate tactile strength information indicative of a tactile strength for the second frequency band on the basis of the second band signal, and an encoded data generation unit (multiplexer 24e) configured to generate encoded data (encoded tactile data Dc) including the tactile strength information and data obtained by encoding the first band signal.

This configuration makes it possible to use the sensitivity characteristics of the human body to improve the compression efficiency of the tactile signal information. The sensitivity characteristics have an easy perception of both the tactile strength variation and frequency variation in the predetermined frequency band, but in another frequency band, the tactile strength variation is easy to perceive, and the frequency variation is difficult to perceive.

Thus, it is possible to reduce the amount of tactile signal data while reducing or preventing the tactile reproducibility from deteriorating.

Further, in the decoder according to an embodiment, the first frequency band is set to be a band in the lower frequency range than the second frequency band.

For the tactile signal in the band of a predetermined frequency or more, the human body perceives a variation in tactile strengths relatively with ease but perceives a variation in frequencies relatively with difficulty.

Thus, the configuration above makes it possible to implement information compression of the tactile signal using such tactile sensitivity characteristics of the human body, resulting in reducing the amount of data of the tactile signal while reducing or preventing the reproducibility of the tactile sensation from deteriorating.

Further, in the decoder as an embodiment, the first frequency band and the second frequency band have a division frequency made to be variable between the first and second frequency bands.

Making the division frequency variable makes it possible to adjust the balance between the effect of reducing the data due to encoding and the effect of reducing or preventing a decrease in tactile reproducibility.

Thus, even in the case where the data reduction effect is intended to be more important than the tactile reproducibility for some reason or the case where, in contrast, the tactile reproducibility is intended to be more important than the data reduction effect, it is possible to optimize the balance between the effect of reducing data and the effect of preventing the tactile reproducibility deterioration depending on various circumstances.

Furthermore, in the decoder as an embodiment, the band division unit changes the division frequency depending on stability of communication with an external device (see FIGS. 18A, 18B, and 18C).

This configuration makes it possible to change the division frequency to enhance the data reduction effect, that is, to lower the bit rate of the communication data, upon unstable communication with the external device to which the encoded data is transmitted. In contrast, upon stable communication, it is possible to change the division frequency to improve the tactile reproducibility.

Thus, it is possible to appropriately adjust the balance between the effect of reducing data and the effect of preventing the tactile reproducibility deterioration depending on the communication stability.

In addition, in the decoder as an embodiment, the band division unit lowers the division frequency in a case where the communication stability is lower than in a case where the communication stability is high.

This configuration makes it possible to change the division frequency to enhance the data reduction effect, that is, to lower the bit rate of the communication data upon unstable communication. In contrast, upon stable communication, it is possible to change the division frequency to improve the tactile reproducibility.

Thus, it is possible to appropriately adjust the balance between reduction or prevention of the occurrence of communication interruption and reduction or prevention of the tactile reproducibility deterioration.

Further, in the decoder as an embodiment, the tactile strength calculation unit calculates the tactile strength information for each frequency in the second frequency band (see step S105 in FIG. 13).

This configuration makes it possible to reproduce, as the tactile strength of the second frequency band, an appropriate tactile strength based on the tactile strength of each frequency in the second band signal before encoding.

Thus, it is possible to reduce or prevent the tactile reproducibility from deteriorating.

Furthermore, in the decoder as an embodiment, in which the tactile strength calculation unit calculates the tactile strength information only for one or more major frequencies in the second frequency band (see step S106 in FIG. 13).

This configuration makes it possible to reproduce, as the tactile strength of the second frequency band, an appropriate tactile strength based on the tactile strength of the major frequency in the second band signal before encoding.

Thus, it is possible to reduce or prevent the tactile reproducibility from deteriorating.

Further, an encoding method as an embodiment includes a band division step of dividing a tactile signal into a first band signal being a signal of a first frequency band and a second band signal being a signal of a second frequency band different from the first frequency band, a first encoding step of encoding the first band signal, a tactile strength calculation step of calculating tactile strength information indicative of a tactile strength for the second frequency band on the basis of the second band signal, and an encoded data generation step of generating encoded data including the tactile strength information and data obtained by encoding the first band signal.

Even such an encoding method according to an embodiment can achieve operations and effects similar to those obtained by the decoder according to the embodiments described above.

Herein, the functions of the encoding unit (24) and the decoding unit (34) described above can be implemented as software processing by a CPU or the like. The software processing is executed on the basis of a program.

The first program as an embodiment is a program causing an information processing apparatus to implement as: a first decoding function of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal; a second decoding function of decoding a second band signal being a signal of the second frequency band in the tactile signal on the basis of the tactile strength information in the encoded data; and a synthesis function of synthesizing the first band signal decoded by the first decoding function and the second band signal decoded by the second decoding function.

Using such a first program makes it possible to implement the decoder according to the embodiments described above.

Further, the second program as an embodiment is a program causing an information processing apparatus to implement as: a band division function of dividing a tactile signal into a first band signal being a signal of a first frequency band and a second band signal being a signal of a second frequency band different from the first frequency band; a first encoding function of encoding the first band signal; a tactile strength calculation function of calculating tactile strength information indicative of a tactile strength for the second frequency band on the basis of the second band signal; and an encoded data generation function of generating encoded data including the tactile strength information and data obtained by encoding the first band signal.

Using such a second program makes it possible to implement the encoder according to the embodiments described above.

The first or second program described above can be recorded in advance in a recording medium built in a device such as a computer device, ROM in a microcomputer having a CPU, or the like.

Alternatively, such programs can be stored (recorded) temporarily or permanently on a removable recording medium, such as flexible disks, compact disc read-only memory (CD-ROM), magnet-optical (MO) disc, digital versatile disc (DVD), Blu-ray disc (registered trademark), magnetic disk, semiconductor memory, memory card, or the like. Such removable recording media are available as so-called package software.

In addition, the first or second program can be installed on a personal computer or the like from a removable recording medium as well as downloaded from a download website via a network such as the Internet or local area network (LAN).

Further, the first or second program is suitable for a wide range of provisions of the decoder or the encoder according to the embodiments. For example, downloading the program to a personal computer, a portable information processing device, a mobile phone, a game machine, audiovisual (AV) equipment, or the like enables the personal computer or the like to function as the decoder or the encoder of the present technology.

Note that the effects described in the present specification are merely examples and are not limited, and there may be other effects.

<8. Present Technology>

Additionally, the present technology may also adopt configuration the following configuration.

(1)

A decoder including:
a first decoding unit configured to, for encoded data obtained by encoding a tactile signal, decode a first band signal being a signal of a first frequency band in the tactile signal, the encoded data including data obtained by encoding the first band signal and tactile strength information indicative of a tactile strength for a second frequency band different from the first frequency band in the tactile signal;
a second decoding unit configured to decode a second band signal being a signal of the second frequency band in the tactile signal on the basis of the tactile strength information in the encoded data; and
a synthesis unit configured to synthesize the first band signal decoded by the first decoding unit and the second band signal decoded by the second decoding unit.

(2)

The decoder according to (1), in which
the first frequency band is set to be a band in a lower frequency range than the second frequency band.

(3)

The decoder according to (1) or (2), in which
the tactile strength information is calculated for each frequency in the second frequency band, and
the second decoding unit
decodes the second band signal on the basis of a total value of the tactile strengths indicated by the tactile strength information calculated for each frequency.

(4)

The decoder according to any one of (1) or (2), in which
the tactile strength information is calculated for one or more major frequencies in the second frequency band, and
the second decoding unit
decodes the second band signal on the basis of the tactile strength indicated by the tactile strength information calculated for the major frequency.

(5)

The decoder according to any one of (1) to (3), in which
the second decoding unit
converts the tactile strength indicated by the tactile strength information into a signal amplitude and
generates a periodic signal having the converted signal amplitude as a decoded signal of the second band signal, the periodic signal having a signal frequency set to a frequency in the second frequency band.

(6)

The decoder according to (5), in which
the periodic signal has the frequency substantially matching a resonance frequency of a tactile presentation device.

(7)

The decoder according to (5) or (6), in which
the periodic signal has the frequency set on the basis of tactile sensitivity characteristics of a human body.

(8)

The decoder according to any one of (5) to (7), in which
the periodic signal has the frequency set on the basis of auditory sensitivity characteristics of a human body.

(9)

The decoder according to any one of (5) to (8), in which
the second decoding unit
sets the frequency of the periodic signal on the basis of an operation.

(10)

A decoding method including:
a first decoding step of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal;
a second decoding step of decoding a second band signal being a signal of the second frequency band in the tactile signal on the basis of the tactile strength information in the encoded data; and
a synthesis step of synthesizing the first band signal decoded in the first decoding step and the second band signal decoded in the second decoding step.

(11)

A program causing an information processing apparatus to implement as:
a first decoding function of, for encoded data obtained by encoding a tactile signal, decoding a first band signal being a signal of a first frequency band in the tactile signal, the encoded data including data obtained by encoding the first band signal and tactile strength information indicative of a tactile strength for a second frequency band different from the first frequency band in the tactile signal;
a second decoding function of decoding a second band signal being a signal of the second frequency band in the tactile signal on the basis of the tactile strength information in the encoded data; and
a synthesis function of synthesizing the first band signal decoded by the first decoding function and the second band signal decoded by the second decoding function.

(12)

An encoder including:
a band division unit configured to divide a tactile signal into a first band signal being a signal of a first frequency band and a second band signal being a signal of a second frequency band different from the first frequency band;
a first encoding unit configured to encode the first band signal;
a tactile strength calculation unit configured to calculate tactile strength information indicative of a tactile strength for the second frequency band on the basis of the second band signal; and
an encoded data generation unit configured to generate encoded data including the tactile strength information and data obtained by encoding the first band signal.

(13)

The encoder according to (12), in which
the first frequency band is set to be a band in a lower frequency range than the second frequency band.

(14)

The encoder according to (12) or (13), in which
the first frequency band and the second frequency band have a division frequency made to be variable between the first and second frequency bands.

(15)
The encoder according to (14), in which
the band division unit
changes the division frequency depending on stability of communication with an external device.

(16)
The encoder according to (15), in which
the band division unit
lowers the division frequency in a case where the communication stability is lower than in a case where the communication stability is high.

(17)
The encoder according to any one of (12) to (16), in which
the tactile strength calculation unit
calculates the tactile strength information for each frequency in the second frequency band.

(18)
The encoder according to any one of (12) to (16), in which
the tactile strength calculation unit
calculates the tactile strength information only for one or more major frequencies in the second frequency band.

(19)
An encoding method including:
a band division step of dividing a tactile signal into a first band signal being a signal of a first frequency band and a second band signal being a signal of a second frequency band different from the first frequency band;
a first encoding step of encoding the first band signal;
a tactile strength calculation step of calculating tactile strength information indicative of a tactile strength for the second frequency band on the basis of the second band signal; and
an encoded data generation step of generating encoded data including the tactile strength information and data obtained by encoding the first band signal.

(20)
A program causing an information processing apparatus to implement as:
a band division function of dividing a tactile signal into a first band signal being a signal of a first frequency band and a second band signal being a signal of a second frequency band different from the first frequency band;
a first encoding function of encoding the first band signal;
a tactile strength calculation function of calculating tactile strength information indicative of a tactile strength for the second frequency band on the basis of the second band signal; and
an encoded data generation function of generating encoded data including the tactile strength information and data obtained by encoding the first band signal.

REFERENCE SIGNS LIST

1 Tactile reproduction system
2 Encoder
3 Decoder
5 Tactile sensor
6 Tactile presentation device
Dc Encoded tactile data
24 Encoding unit
25 Control unit
26 Storage unit
27 Communication unit
34 Decoding unit
35 Control unit
38 Operation unit
39 Display unit
41 Control unit
42 Communication unit
24a Signal input unit
24b Band division unit
24c Low-frequency signal encoding unit
24d Tactile strength calculation unit
24e Multiplexer
34a Encoded data input unit
34b Demultiplexer
34c Low-frequency signal decoding unit
34d Tactile intensity acquisition unit
34e High-frequency signal generation unit
34f Band synthesis unit

The invention claimed is:

1. A decoder, comprising:
a central processing unit (CPU) configured to:
decode a first band signal of encoded data of a tactile signal, wherein
the first band signal corresponds to a first frequency band in the tactile signal,
the encoded data is based on an encoding result of the first band signal and tactile intensity information, and
the tactile intensity information includes a flag;
determine that the flag indicates one of a first value or a second value;
acquire, based on the determination that the flag indicates the first value, a total value of tactile intensities of a plurality of frequencies of a second frequency band in the tactile signal,
wherein the second frequency band is different from the first frequency band;
acquire, based on the determination that the flag indicates the second value, a tactile intensity of a major frequency of the plurality of frequencies,
wherein an amplitude of the major frequency is equal to or greater than a specific threshold;
generate a second band signal based on one of the total value of the tactile intensities of the plurality of frequencies or the tactile intensity of the major frequency,
wherein the second band signal corresponds to the second frequency band in the tactile signal; and
synthesize the first band signal and the second band signal.

2. The decoder according to claim 1, wherein the first frequency band is in a lower frequency range than the second frequency band.

3. The decoder according to claim 1, wherein
the CPU is further configured to:
convert the total value of the tactile intensities into a signal amplitude; and
generate a periodic signal that has the signal amplitude, and
the periodic signal has a signal frequency set to a frequency of the plurality of frequencies of the second frequency band.

4. The decoder according to claim 3, wherein the periodic signal has the signal frequency that substantially matches a resonance frequency of a tactile presentation device.

5. The decoder according to claim 3, wherein the periodic signal has the signal frequency based on tactile sensitivity characteristics of a human body.

6. The decoder according to claim 3, wherein the periodic signal has the signal frequency based on auditory sensitivity characteristics of a human body.

7. The decoder according to claim 3, wherein the CPU is further configured to set the signal frequency of the periodic signal based on a specific operation.

8. A decoding method, comprising:
  decoding a first band signal of encoded data of a tactile signal, wherein
    the first band signal corresponds to a first frequency band in the tactile signal,
    the encoded data is based on an encoding result of the first band signal and tactile intensity information, and
    the tactile intensity information includes a flag;
  determining that the flag indicates one of a first value or a second value;
  acquiring, based on the determination that the flag indicates the first value, a total value of tactile intensities of a plurality of frequencies of a second frequency band in the tactile signal,
    wherein the second frequency band is different from the first frequency band;
  acquiring, based on the determination that the flag indicates the second value, a tactile intensity of a major frequency of the plurality of frequencies,
    wherein an amplitude of the major frequency is equal to or greater than a specific threshold;
  generating a second band signal based on one of the total value of the tactile intensities of the plurality of frequencies or the tactile intensity of the major frequency,
    wherein the second band signal corresponds to the second frequency band in the tactile signal; and
  synthesizing the first band signal and the second band signal.

9. A non-transitory computer-readable medium having stored thereon, computer-executable instructions which, when executed by a computer, cause the computer to execute operations, the operations comprising:
  decoding a first band signal of encoded data of a tactile signal, wherein
    the first band signal corresponds to a first frequency band in the tactile signal,
    the encoded data is based on an encoding result of the first band signal and tactile intensity information, and
    the tactile intensity information includes a flag;
  determining that the flag indicates one of a first value or a second value;
  acquiring, based on the determination that the flag indicates the first value, a total value of tactile intensities of a plurality of frequencies of a second frequency band in the tactile signal,
    wherein the second frequency band is different from the first frequency band;
  acquiring, based on the determination that the flag indicates the second value, a tactile intensity of a major frequency of the plurality of frequencies,
    wherein an amplitude of the major frequency is equal to or greater than a specific threshold;
  generating a second band signal based on one of the total value of the tactile intensities of the plurality of frequencies or the tactile intensity of the major frequency,
    wherein the second band signal corresponds to the second frequency band in the tactile signal; and
  synthesizing the first band signal and the second band signal.

10. An encoder, comprising:
  a central processing unit (CPU) configured to:
    divide a tactile signal into a first band signal and a second band signal;
    encode the first band signal, wherein
      the first band signal corresponds to a first frequency band in the tactile signal,
      the second band signal corresponds to a second frequency band in the tactile signal, and
      the second frequency band is different from the first frequency band;
    determine that a plurality of frequencies in the second frequency band includes a major frequency or does not include the major frequency,
      wherein an amplitude of the major frequency is equal to or greater than a specific threshold;
    calculate a total value of tactile intensities of the plurality of frequencies based on the determination that the plurality of frequencies does not include the major frequency;
    calculate a tactile intensity of the major frequency based on the determination that the plurality of frequencies includes the major frequency;
    generate tactile intensity information that includes a flag, and one of the total value of the tactile intensities of the plurality of frequencies or the tactile intensity of the major frequency, wherein
      the flag indicates a first value based on the determination that the plurality of frequencies does not include the major frequency, and
      the flag indicates a second value based on the determination that the plurality of frequencies includes the major frequency; and
    generate encoded data that includes the tactile intensity information and the encoded first band signal.

11. The encoder according to claim 10, wherein the first frequency band is in a lower frequency range than the second frequency band.

12. The encoder according to claim 10, wherein the first frequency band and the second frequency band include a division frequency that varies between the first frequency band and the second frequency band.

13. The encoder according to claim 12, wherein the CPU is further configured to change the division frequency based on a stability of communication with an external device.

14. The encoder according to claim 13, wherein the CPU is further configured to lower the division frequency based on a decrease of the stability of the communication.

15. An encoding method, comprising:
  dividing a tactile signal into a first band signal and a second band signal;
  encoding the first band signal, wherein
    the first band signal corresponds to a first frequency band in the tactile signal,
    the second band signal corresponds to a second frequency band in the tactile signal, and
    the second frequency band is different from the first frequency band;
  determining that a plurality of frequencies in the second frequency band includes a major frequency or does not include the major frequency,
    wherein an amplitude of the major frequency is equal to or greater than a specific threshold;
  calculating a total value of tactile intensities of the plurality of frequencies based on the determination that the plurality of frequencies does not include the major frequency;

calculating a tactile intensity of the major frequency based on the determination that the plurality of frequencies includes the major frequency;

generating tactile intensity information that includes a flag, and one of the total value of the tactile intensities of the plurality of frequencies or the tactile intensity of the major frequency, wherein
- the flag indicates a first value based on the determination that the plurality of frequencies does not include the major frequency, and
- the flag indicates a second value based on the determination that the plurality of frequencies includes the major frequency; and generating encoded data that includes the tactile intensity information and the encoded first band signal.

16. A non-transitory computer-readable medium having stored thereon, computer-executable instructions which, when executed by a computer, cause the computer to execute operations, the operations comprising:

dividing a tactile signal into a first band signal and a second band signal;

encoding the first band signal, wherein
- the first band signal corresponds to a first frequency band in the tactile signal,
- the second band signal corresponds to a second frequency band in the tactile signal, and
- the second frequency band is different from the first frequency band;

determining that a plurality of frequencies in the second frequency band includes a major frequency or does not include the major frequency,
- wherein an amplitude of the major frequency is equal to or greater than a specific threshold;

calculating a total value of tactile intensities of the plurality of frequencies based on the determination that the plurality of frequencies does not include the major frequency;

calculating a tactile intensity of the major frequency based on the determination that the plurality of frequencies includes the major frequency;

generating tactile intensity information that includes a flag, and one of the total value of the tactile intensities of the plurality of frequencies or the tactile intensity of the major frequency, wherein
- the flag indicates a first value based on the determination that the plurality of frequencies does not include the major frequency, and
- the flag indicates a second value based on the determination that the plurality of frequencies includes the major frequency; and generating encoded data that includes the tactile intensity information and the encoded first band signal.

* * * * *